(12) United States Patent
Mori et al.

(10) Patent No.: US 10,690,943 B2
(45) Date of Patent: Jun. 23, 2020

(54) LAMINATE AND OPTICAL ARTICLE COMPRISING THE SAME

(71) Applicant: TOKUYAMA CORPORATION, Shunan-shi, Yamaguchi (JP)

(72) Inventors: Katsuhiro Mori, Shunan (JP); Toshimitsu Hiraren, Shunan (JP); Manami Oshio, Shunan (JP)

(73) Assignee: TOKUYAMA CORPORATION, Shunan-Shi (JP)

( * ) Notice: Subject to any disclaimer, the term of this patent is extended or adjusted under 35 U.S.C. 154(b) by 72 days.

(21) Appl. No.: 16/065,027

(22) PCT Filed: Dec. 22, 2016

(86) PCT No.: PCT/JP2016/089226
§ 371 (c)(1),
(2) Date: Jun. 21, 2018

(87) PCT Pub. No.: WO2017/115874
PCT Pub. Date: Jul. 6, 2017

(65) Prior Publication Data
US 2019/0004336 A1   Jan. 3, 2019

(30) Foreign Application Priority Data

Dec. 28, 2015   (JP) ................... 2015/255814
Apr. 25, 2016   (JP) ................... 2016/086661
(Continued)

(51) Int. Cl.
*G02C 7/10*        (2006.01)
*B32B 27/42*       (2006.01)
(Continued)

(52) U.S. Cl.
CPC ............... *G02C 7/102* (2013.01); *B32B 7/12* (2013.01); *B32B 23/08* (2013.01); *B32B 23/20* (2013.01);
(Continued)

(58) Field of Classification Search
CPC ....... B32B 27/306; B32B 27/08; B32B 23/20; B32B 27/00; B32B 27/36; B32B 27/365;
(Continued)

(56) References Cited

U.S. PATENT DOCUMENTS 7,289,257 B1    10/2007  Nakagoshi
2002/0006505 A1  1/2002  Nishizawa et al.
(Continued)

FOREIGN PATENT DOCUMENTS

JP    63-178193 A    7/1988
JP    1-163287 A     6/1989
(Continued)

OTHER PUBLICATIONS

International Preliminary Report on Patentability and English translation of the International Searching Authority (Forms PCT/IB/338, PCT/IB/373, PCT/ISA/237) for International Application No. PCT/JP2016/089226, dated Jul. 12, 2018.
(Continued)

*Primary Examiner* — Tuyen Tra
(74) *Attorney, Agent, or Firm* — Birch, Stewart, Kolasch & Birch, LLP

(57) ABSTRACT

To provide a laminate comprising a pair of polycarbonate optical sheet or film which are laminated together through a polarizing film layer and an adhesive layer of a photochromic composition comprising (I) a polyurethane urea resin and (II) a photochromic compound and having excellent photochromic properties, adhesion, heat resistance, perspiration resistance and excellent adhesion to a lens substrate.

13 Claims, 3 Drawing Sheets

(30) Foreign Application Priority Data

Aug. 2, 2016 (JP) .................................. 2016/151657
Oct. 27, 2016 (JP) .................................. 2016/211122

(51) Int. Cl.

| | | |
|---|---|---|
| *C08G 18/10* | (2006.01) | |
| *G02C 7/12* | (2006.01) | |
| *B32B 27/36* | (2006.01) | |
| *B32B 27/00* | (2006.01) | |
| *G02B 5/23* | (2006.01) | |
| *G02B 5/30* | (2006.01) | |
| *C08G 18/73* | (2006.01) | |
| *C08G 18/42* | (2006.01) | |
| *C08G 18/78* | (2006.01) | |
| *C08G 18/75* | (2006.01) | |
| *C08G 18/76* | (2006.01) | |
| *C08G 18/44* | (2006.01) | |
| *B32B 23/20* | (2006.01) | |
| *C08G 18/32* | (2006.01) | |
| *C08G 18/48* | (2006.01) | |
| *C08G 18/72* | (2006.01) | |
| *B32B 27/08* | (2006.01) | |
| *B32B 27/30* | (2006.01) | |
| *C08G 18/79* | (2006.01) | |
| *B32B 7/12* | (2006.01) | |
| *B32B 23/08* | (2006.01) | |

(52) U.S. Cl.
CPC .............. *B32B 27/00* (2013.01); *B32B 27/08* (2013.01); *B32B 27/306* (2013.01); *B32B 27/36* (2013.01); *B32B 27/365* (2013.01); *B32B 27/42* (2013.01); *C08G 18/10* (2013.01); *C08G 18/3215* (2013.01); *C08G 18/42* (2013.01); *C08G 18/4277* (2013.01); *C08G 18/44* (2013.01); *C08G 18/48* (2013.01); *C08G 18/4825* (2013.01); *C08G 18/725* (2013.01); *C08G 18/73* (2013.01); *C08G 18/751* (2013.01); *C08G 18/755* (2013.01); *C08G 18/758* (2013.01); *C08G 18/7678* (2013.01); *C08G 18/7685* (2013.01); *C08G 18/7831* (2013.01); *C08G 18/792* (2013.01); *G02B 5/23* (2013.01); *G02B 5/30* (2013.01); *G02C 7/12* (2013.01); *B32B 2250/03* (2013.01); *B32B 2250/04* (2013.01); *B32B 2250/05* (2013.01); *B32B 2255/10* (2013.01); *B32B 2255/26* (2013.01); *B32B 2307/306* (2013.01); *B32B 2307/4026* (2013.01); *B32B 2307/412* (2013.01); *B32B 2307/42* (2013.01); *B32B 2307/558* (2013.01); *B32B 2551/00* (2013.01)

(58) Field of Classification Search
CPC .............................. B32B 23/08; B32B 7/12; B32B 27/42; B32B 2307/42; B32B 2307/412; B32B 2255/10; B32B 2255/26; B32B 2250/04; B32B 2551/00; B32B 2307/558; B32B 2250/03; B32B 2307/4026; B32B 2250/05; B32B 2307/306; C08G 18/792; C08G 18/755; C08G 18/4825; C08G 18/42; C08G 18/751; C08G 18/725; C08G 18/48; C08G 18/3215; C08G 18/7678; C08G 18/44; C08G 18/7685; C08G 18/758; C08G 18/7831; C08G 18/4277; C08G 18/73; G02C 7/102; G02C 7/12; G02B 5/30; G02B 5/23
USPC ................................. 351/200, 222, 239, 241
See application file for complete search history.

(56) References Cited

U.S. PATENT DOCUMENTS

| | | |
|---|---|---|
| 2002/0197484 A1 | 12/2002 | Nishizawa et al. |
| 2013/0215488 A1 | 8/2013 | Hiraren et al. |

FOREIGN PATENT DOCUMENTS

| | | |
|---|---|---|
| JP | 3-56571 B2 | 8/1991 |
| JP | 2002-62423 A | 2/2002 |
| JP | 4586953 B2 | 11/2010 |
| JP | 4661017 B2 | 3/2011 |
| JP | 5037614 B2 | 10/2012 |
| JP | 2013-33131 A | 2/2013 |
| JP | 2016-169363 A | 9/2016 |

OTHER PUBLICATIONS

Extended European Search Report for Corresponding European Application No. 16881848.2, dated Jun. 14, 2019.
International Search Report for PCT/JP2016/089226 (PCT/ISA/210) dated Mar. 21, 2017.
Written Opinion of the International Searching Authority for PCT/JP2016/089226 (PCT/ISA/237) dated Mar. 21, 2017.

LAMINATE AND OPTICAL ARTICLE COMPRISING THE SAME

TECHNICAL FIELD

The present invention relates to a laminate which is used to produce lenses such as polarizing lenses having polarization properties and sunglass lenses having photochromic properties and an optical article comprising the laminate.

BACKGROUND ART

Demand for plastic substrates composed of polycarbonate having transparency and excellent impact resistance for use in sunglasses having glare shielding property is now growing rapidly mainly in the U.S. Plastic photochromic sunglasses which are capable of controlling glare shielding property due to variations in transmittance according to surrounding brightness and the amount of ultraviolet light by combining photochromic properties are becoming popular rapidly. These sunglasses are now manufactured by the following method.

For example, as means for forming a functional layer having glare shielding property between two plastic sheets or films, there is known a method in which a photochromic layer is formed between two polycarbonate sheets (refer to Japan Patent No. 4661017). Stated more specifically, a photochromic coating solution containing a solvent is applied to one of the plastic sheets, let pass through a drier having a specific temperature at a specific rate to be dried, and bonded to the other plastic sheet to produce a laminate. According to this method, a laminate having an adhesive layer with excellent smoothness can be produced continuously.

Further, the above laminate having a photochromic layer can be formed into a desired shape by carrying out thermal bending in which the laminate is shaped under an increased or reduced pressure (vacuum) in a heating environment, for example, at a heating temperature close to the glass transition temperature of the laminate by using a mold which has been caved into a desired shape in advance. The laminate is generally diecut into a desired shape before or after the above thermal bending.

Further, the laminate which has been thermally bent is set in the mold of an injection molding machine, and a thermoplastic resin is injection molded on the concave side of the thermally bent laminate to integrate an optical substrate composed of the thermoplastic resin with the laminate, thereby producing sunglasses.

Sunglasses provided with both polarization properties and photochromic properties were developed in order to adjust transmittance according to surrounding brightness and the amount of ultraviolet light while suppressing the glare of reflected light.

As means for manufacturing the sunglasses provided with both polarization properties and photochromic properties, there is known a method in which a photochromic layer and a polarizing layer are formed between two polycarbonate films (refer to Japan Patent No. 4586953). Stated more specifically, after a photochromic coating solution containing a solvent is applied to a polarizing film, dried and bonded to a polycarbonate film, a urethane-based adhesive is applied to the other side of the polarizing film, dried and bonded to the other polycarbonate sheet so as to produce a laminate. According to this method, a laminate having an adhesive layer with excellent smoothness can be produced continuously.

There is also known a method in which a photochromic layer and a polarizing layer are formed between a cellulose triacetate film and a polycarbonate film (refer to Japan Patent No. 5037614). Stated more specifically, Japan Patent No. 5037614 discloses the following method. A polarizing sheet having a polarizing layer between two cellulose triacetate films is prepared, and a two-liquid curable urethane resin is applied as an adhesive to one side of the polarizing sheet to bond a polycarbonate film thereto. Then, a two-liquid curable urethane resin containing a photochromic compound is applied as an adhesive to the other side of the polarizing sheet to bond a cellulose triacetate film thereto, thereby producing a laminate. According to this method, a laminate having an adhesive layer with excellent smoothness and photochromic properties can be produced continuously.

However, according to studies conducted by the inventors of the present invention, it was found that the adhesion (adhesion between plastic sheets) of each of the laminates produced by the methods disclosed by Japan Patent No. 4661017, Japan Patent No. 4586953 and Japan Patent No. 5037614 is inferior in terms of "perspiration resistance" which is required for sunglasses, that is, a state that a laminate does not change even when in contact with human perspiration. That is, it was found that in sunglasses which comprise a conventional laminate, the interface between the adhesive layer and the polycarbonate sheet or between the adhesive layer and the cellulose triacetate film may separate.

As means for improving adhesion between the photochromic layer and the optical sheet or optical film, there is proposed a method in which a photochromic polyurethane urea resin layer formed by using a photochromic compound and a polyurethane urea resin and an optical sheet or optical film are laminated through an adhesive layer (refer to JP-A 2013-33131).

DISCLOSURE OF THE INVENTION

A laminate having excellent adhesion and including a photochromic layer and a polarizing layer can be obtained by the method of JP-A 2013-33131.

However, the laminate obtained by this method is constituted such that the front surface and rear surface of the laminate are composed of sheets composed of different materials, that is, a cellulose triacetate film and a polycarbonate sheet. To fully develop photochromic properties as sunglasses, a photochromic layer must be situated on the side to be irradiated with sunlight with respect to a polarizing sheet. Therefore, the optimal lamination order of the laminate from the side to be irradiated with sunlight is a polycarbonate sheet, a photochromic layer, a cellulose triacetate film, a polarizing layer and a cellulose triacetate film.

However, according to studies conducted by the inventors of the present invention, it was found that when a thermoplastic resin such as polycarbonate resin is injection molded on the rear surface layer opposite to the side to be irradiated with sunlight, that is, the cellulose triacetate film layer to manufacture a lens integrated with the above laminate, adhesion between the cellulose triacetate film and the thermoplastic resin in the laminate having the above lamination order becomes unsatisfactory.

It is therefore an object of the present invention to provide a laminate having excellent photochromic properties, adhesion, heat resistance and perspiration resistance and further a laminate having excellent adhesion between the above laminate and a lens substrate.

The inventors of the present invention conducted intensive studies to solve the above problem and found that the following conditions are required when a polycarbonate layer as a thermoplastic resin layer is injection molded on the rear side of a laminate to manufacture a lens integrated with the laminate. That is, they found that adhesion between a laminate and a lens substrate can be improved by using an optical sheet or film composed of polycarbonate which is the same thermoplastic resin as a polycarbonate layer to be injected as the rear surface of the laminate and a specific resin in a photochromic layer. The present invention was thus accomplished based on this finding.

That is, the present invention is (1) a laminate comprising a pair of polycarbonate optical sheets or films which are laminated together through a polarizing film layer and an adhesive layer of a photochromic composition comprising (I) a polyurethane urea resin and (II) a photochromic compound.

The above laminate of the present invention can take the following modes.

(2) The polydispersity, that is, weight average molecular weight/number average molecular weight ratio of the above polyurethane urea resin (I) is 1.6 to 2.4.

(3) The above photochromic composition further comprises (III) a polyisocyanate compound having at least two isocyanate groups in the molecule.

(4) The polyisocyanate compound having at least two isocyanate groups in the molecule (III) is at least one polyisocyanate compound selected from the group consisting of a compound having an isocyanate group bonded to a secondary carbon, hexamethylene diisocyanate, burette compound of hexamethylene diisocyanate, isocyanurate compound of hexamethylene diisocyanate and adduct compound of hexamethylene diisocyanate.

(5) The above polyisocyanate compound having at least two isocyanate groups in the molecule (III) comprises (IIIA) a compound having an isocyanate group bonded to a secondary carbon and (IIIB) at least one compound selected from the group consisting of hexamethylene diisocyanate, burette compound of hexamethylene diisocyanate, isocyanurate compound of hexamethylene diisocyanate and adduct compound of hexamethylene diisocyanate.

(6) The above polyisocyanate compound having at least two isocyanate groups in the molecule (III) comprises 100 parts by mass of the compound having an isocyanate group bonded to a secondary carbon (IIIA) and 20 to 150 parts by mass of at least one compound (IIIB) selected from the group consisting of hexamethylene diisocyanate, burette compound of hexamethylene diisocyanate, isocyanurate compound of hexamethylene diisocyanate and adduct compound of hexamethylene diisocyanate.

(7) The above polyurethane urea resin (I) is a reaction product of (A) a urethane prepolymer having an isocyanate group at the end of the molecule, (B) a polyamine compound having at least two amino groups in the molecule and (C) a compound having one group able to react with an isocyanate group in the molecule.

(8) The above polycarbonate optical sheets or films and the polarizing film layer and/or the polarizing film layer and the adhesive layer of the photochromic composition are laminated together through an adhesive layer containing no photochromic compound.

(9) At least one optical sheet or film is existent between the above polarizing film layer and the above adhesive layer of the photochromic composition.

(10) A cellulose triacetate film is laminated on both sides of the polarizing film layer.

(11) The softening point of the above adhesive layer of the photochromic composition is not lower than 100° C.

(12) The softening points of the above adhesive layer of the photochromic composition and the above adhesive layer containing no photochromic compound are not lower than 100° C.

(13) The polycarbonate optical sheet or film, the above adhesive layer containing no photochromic compound, the above adhesive layer of the photochromic composition, the polarizing film layer, the above adhesive layer containing no photochromic compound and the polycarbonate optical sheet or film are laminated in this order.

(14) The adhesive layer of the photochromic composition described before the polarizing film differs from the adhesive layer containing no photochromic compound described after the polarizing film only in that the former layer contains the photochromic compound.

(15) An adhesive layer which differs from the adhesive layer containing no photochromic compound is further existent between the adhesive layer containing no photochromic compound described after the polarizing film layer and the polycarbonate optical sheet or film.

(16) Further, in another invention of the present invention, an optical article having a polycarbonate layer on the front surface of a polycarbonate optical sheet or film on the polarizing film layer side of the laminate.

PRACTICAL EMBODIMENT OF THE INVENTION

Figure 1:
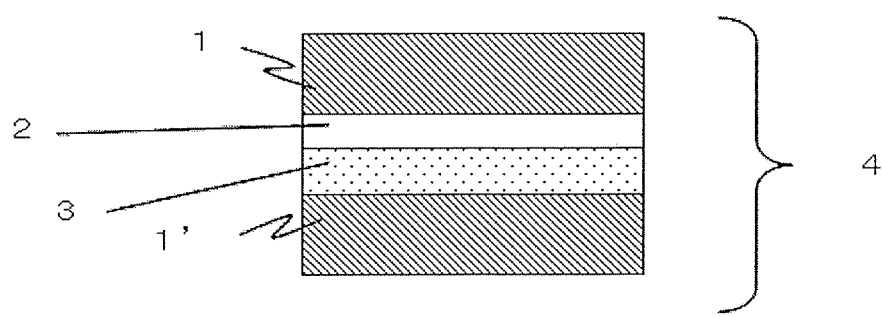
FIG. 1 is a drawing for explaining a first example showing the constitution of the laminate of the present invention.

The laminate of the present invention is a laminate formed by laminating a pair of polycarbonate optical sheets or films through a polarizing film layer and an adhesive layer composed of a photochromic composition comprising (I) a polyurethane urea resin and (II) a photochromic compound. With reference to FIG. 1, the present invention will be described by taking the laminate of the present invention as an example.

Referring to FIG. 1, the laminate 4 of the present invention is constituted such that a pair of opposed polycarbonate optical sheets or films 1 and 1' contain a polarizing film layer 3 and an adhesive layer 2 composed of a photochromic composition. In the following description, the exposed surface of an optical sheet or film on the adhesive layer side composed of the photochromic composition of the laminate will be referred to as "front surface" and the exposed surface of an optical sheet or film on the polarizing film side will be referred to as "rear surface". As will be described in detail hereinunder, the polycarbonate optical sheet or film 1 existent on the front side of the laminate in FIGS. 1 to 5 is preferably stretched in a monoaxial direction which is the same axial direction as the polarizing film which will be described hereinafter.

Figure 2:
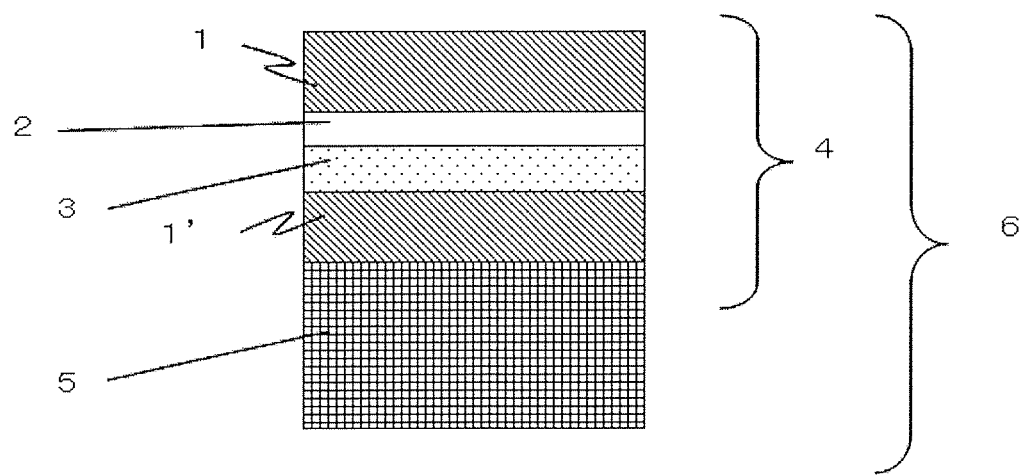
FIG. 2 is a drawing for explaining the constitution of an optical article formed by using the laminate of the present invention.

FIG. 2 shows an example of an optical article formed by using the laminate of the present invention. That is, this is an optical article 6 which includes a polycarbonate optical sheet or film 1' used as the rear surface of the laminate 4 of the present invention and a lens substrate 5 which is obtained by injection molding a polycarbonate which is a thermoplastic resin to form a polycarbonate layer on the rear side.

Figure 3:
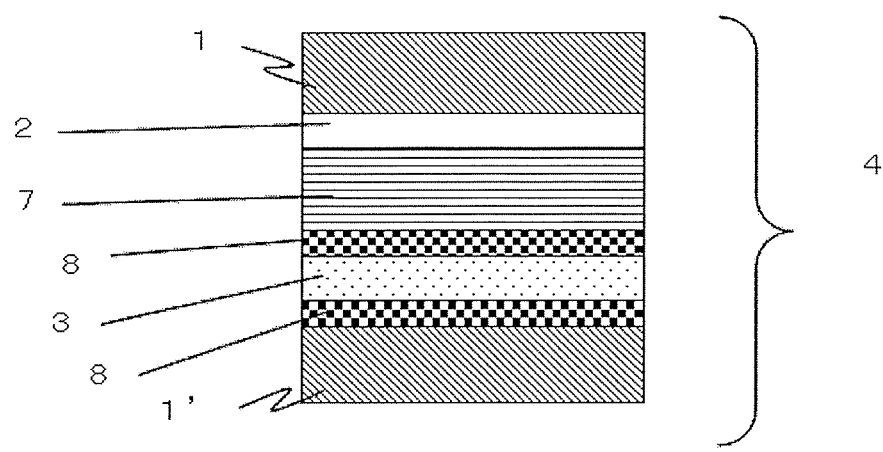
FIG. 3 is a drawing for explaining a second example showing the constitution of the laminate of the present invention.

FIG. 3 shows a second example showing the constitution of the laminate of the present invention. This is constituted such that a pair of opposed polycarbonate optical sheets or films 1 and 1' contain a polarizing film layer 3 and an adhesive layer 2 composed of a photochromic composition. This is a laminate in which a third optical sheet or film 7 or a polycarbonate optical sheet or film 1' is attached to both sides of the polarizing layer 3 through adhesive layers 8.

Figure 4:
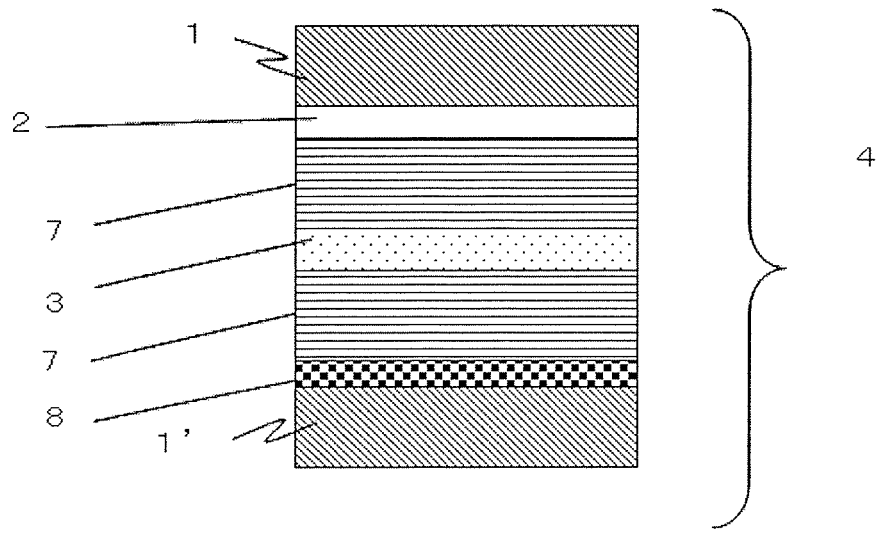
FIG. 4 is a drawing for explaining a third example showing the constitution of the laminate of the present invention.

FIG. 4 shows a third example showing the constitution of the laminate of the present invention. This is constituted such that a pair of opposed polycarbonate optical sheets or films 1 and 1' contain a polarizing film layer 3 and an adhesive layer 2 composed of a photochromic composition. Third optical sheets or films 7 are adhering to both sides of the polarizing film layer 3, respectively, one of the third optical sheets or films 7 is formed on an adhesive layer 2 composed of a photochromic composition, and the other third optical sheet or film 7 is attached to the polycarbonate optical sheet or film 1' through an adhesive layer 8.

Figure 5:
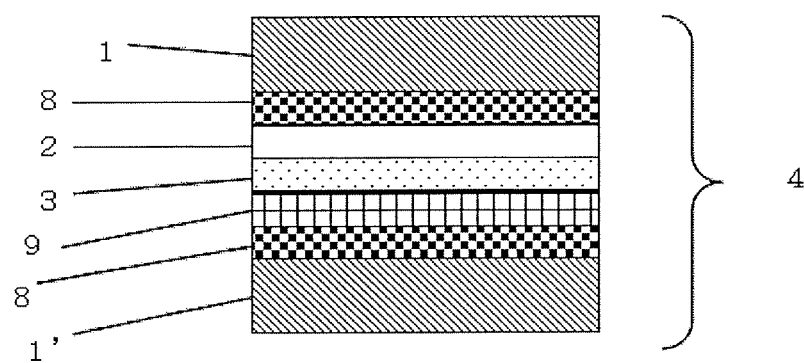
FIG. 5 is a drawing for explaining a fourth example showing the constitution of the laminate of the present invention.

FIG. 5 shows a fourth example showing the constitution of the laminate of the present invention. This is constituted such that a pair of opposed polycarbonate optical sheets or films 1 and 1' contain a polarizing film layer 3 and an adhesive layer 2 composed of a photochromic composition. The laminate includes, from the top polycarbonate optical sheet or film 1, an adhesive layer 8, the adhesive layer 2 composed of a photochromic composition, the polarizing film layer 3, an adhesive layer 9, an adhesive layer 8 and the polycarbonate optical sheet or film 1' in this order. Although the adhesive layer 9 is not essential, when the adhesive layer 9 is existent, adhesion is further improved. Especially when an optical article 6 is obtained by forming a polycarbonate lens substrate 5 on the surface of the polycarbonate optical sheet or film 1' by injection molding, the effect of improving adhesion is obtained notably.

Although the adhesive layer 8 and the adhesive layer 9 do not contain a photochromic compound in the above examples of the laminate, they differ from each other in adhesive.

A detailed description is subsequently given of each constituent component of the laminate of the present invention. A pair of opposed polycarbonate optical sheets or films in the present invention will be first explained.

<Polycarbonate Optical Sheets or Films>

In the present invention, as the polycarbonate optical sheets or films, dyed films or dyed sheets may be used. As a matter of course, films or sheets which are not dyed may also be used. When dyed polycarbonate sheets or films are used, films or sheets which have been dyed may be used or a polycarbonate sheet or film on the front side may be dyed after the production of the laminate of the present invention.

It is preferred that the adhesive layer composed of a photochromic composition should be laminated such that it is irradiated with sunlight or ultraviolet light before the dyed films in the laminate including the dyed films or dyed sheets.

The thickness of each of the polycarbonate optical sheets or films used in the present invention is preferably 30 to 1,000 μm, more preferably 50 to 400 μm. The polycarbonate optical sheets or films may be a combination of sheets or films which differ in thickness.

As the polycarbonate optical sheets or films used in the present invention, from the viewpoint of optical distortion, optical sheets or films which have been stretched in a monoaxial direction which is the same axial direction as that of the polarizing film which will be described hereinafter are preferably used. Further, the optical films or sheets which have been stretched monoaxially preferably have a phase difference of not less than 3,000 nm.

When the polycarbonate optical sheets or films which have been stretched monoaxially are used, at least one of them should be used as the polycarbonate optical sheet or film existent on the front side of the laminate. The other polycarbonate optical sheet or film (including the polycarbonate optical sheet or film existent on the rear side of the laminate) may be an optical sheet or film which has been stretched monoaxially or not stretched.

A description is subsequently given of the polarizing film layer used in the present invention.

<Polarizing Film Layer>

As the polarizing film layer in the present invention, any known polarizing film may be used. Preferably, the polarizing film has a thickness of 10 to 200 μm, a total light transmittance of not less than 30% and a polarization degree of not less than 95.0%. More preferably, the polarizing film has a thickness of 10 to 100 μm, a total light transmittance of not less than 40%, and a polarization degree of not less than 99.0%. When the industrial-scale production of the polarizing film itself is taken into consideration, the upper limit of total light transmittance is 50% and the upper limit of polarization degree is 100%.

In the present invention, the above polarizing film layer is formed by dyeing a polyvinyl alcohol-based film which is generally used as a base film with iodine which is a dichromatic substance or a dichromatic dye and stretching the dyed polyvinyl alcohol-based film monoaxially.

A description is subsequently given of the adhesive layer composed of a photochromic composition used in the present invention. In the present invention, the adhesive layer composed of a photochromic composition comprises (I) a polyurethane urea resin and (II) a photochromic compound. A description is first given of the polyurethane urea resin (I) contained in the photochromic composition.

<Photochromic Composition>

<(I) Polyurethane Urea Resin>

In the present invention, the polyurethane urea resin (I) has a urea bond (—R—NH—CO—NH—) in the molecular chain. Any known polyurethane urea resin may be used. From the viewpoints of adhesion, heat resistance and perspiration resistance, it is preferably a reaction product of (A) a urethane prepolymer having an isocyanate group at the end of the molecule, (B) a polyamine compound having at least two amino groups in the molecule and (C) a compound having one group able to react with an isocyanate group in the molecule. In this polyurethane urea resin, the urea bond is introduced into the molecule due to the use of the polyamine compound as the component (B) which is a raw material. A description is subsequently given of these components. The polyurethane urea resin (I) may be simply referred to as "component (I)" hereinafter.

<Component A: Urethane Prepolymer Having an Isocyanate Group at the End of the Molecule>

A known urethane prepolymer may be used as the urethane prepolymer having an isocyanate group at the end of the molecule (component A) which is a constituent component of the above polyurethane urea resin. It is preferably a reaction product of (A1) at least one polyol compound selected from the group consisting of polyols having at least two hydroxyl groups such as polyether polyols, polyester polyols, polycarbonate polyols and polycaprolactone polyols and (A2) a diisocyanate compound having two isocyanate groups in the molecule.

<Component A1: At Least One Polyol Compound Selected from the Group Consisting of Polyols Having at Least Two Hydroxyl Groups Such as Polyether Polyols, Polyester Polyols, Polycarbonate Polyols Sand Polycaprolactone Polyols>

The number of hydroxyl groups contained in one molecule of the above polyol compound (component A1) is preferably 2 to 6 for the reason that the formed polyurethane urea resin (component I) does not become a highly cross-linked material. The number of hydroxyl groups contained in the molecule is more preferably 2 to 3 in consideration of solubility in an organic solvent. The above polyol compounds such as polyether polyols, polyester polyols, polycarbonate polyols and polycaprolactone polyols may be used alone or in combination of two or more. Out of these, polycarbonate polyols and polycaprolactone polyols are preferably used from the viewpoints of heat resistance, adhesion, weatherability and hydrolysis resistance. A detailed description is given of each compound used as the component A1.

<Polycarbonate Polyol>

Examples of the polycarbonate polyol used as the component A1 include polycarbonate polyols obtained by phosgenating at least one low-molecular weight polyol such as ethylene glycol, 1,2-propanediol, 1,3-propanediol, 2-methyl-1,3-propanediol, 1,2-butanediol, 1,3-butanediol, 1,4-butanediol, 1,5-pentanediol, 1,6-hexanediol, 1,8-octanediol, 1,9-nonanediol, 1,10-decanediol, 3-methyl-1,5-pentanediol, 2-ethyl-4-butyl-1,3-propanediol, diethylene glycol, dipropylene glycol, neopentyl glycol, cyclohexane-1,4-diol, cyclohexane-1,4-dimethanol, dimeric acid diol, ethylene oxide or propylene oxide adduct of bisphenol A, bis(β-hydroxyethyl)benzene, xylylene glycol, glycerin, trimethylolpropane or pentaerythritol or by transesterifying a low-molecular weight carbonate such as ethylene carbonate, diethyl carbonate or diphenyl carbonate. Out of these low-molecular weight polyols, low-molecular weight polyols having a linear alkylene chain are more preferred from the viewpoints of the adhesion and heat resistance of the finally obtained polyurethane urea resin (component I). Polycarbonate polyols synthesized from low-molecular weight polyols having an alkyl group in the side chain tend to deteriorate in adhesion as compared with low-molecular weight polyols having a linear alkylene chain.

The number average molecular weight of the polycarbonate polyol as the component A1 is preferably 400 to 2,000, more preferably 500 to 1,500, most preferably 600 to 1,200 from the viewpoint of the heat resistance of the finally obtained polyurethane urea resin (component I).

These polycarbonate polyols can be acquired industrially as a reagent. Commercially available products thereof include the Duranol (registered trademark) series of Asahi Kasei Chemicals Corporation, the Kuraray Polyol (registered trademark) series of Kuraray Co., Ltd., the Placcel (registered trademark) series of Daicel Chemical Industries, Ltd., the Nipporan (registered trademark) series of Nippon Polyurethane Industry Co., Ltd., and the ETERNACOLL (registered trademark) series of Ube Industries., Ltd.

<Polycaprolactone Polyol>

The polycaprolactone polyol used as the component A1 is preferably a compound obtained by the ring-opening polymerization of ε-caprolactone. The number average molecular weight of the polycaprolactone polyol as the component A1 is preferably 400 to 2,000, more preferably 500 to 1,500, most preferably 600 to 1,200 for the same reason as that of the polycarbonate polyol.

The polycaprolactone polyol can be acquired industrially as a reagent. Commercially available products thereof include the Placcel (registered trademark) series of Daicel Chemical Industries, Ltd.

<Polyether Polyol>

Examples of the polyether polyol include polyether polyol compounds obtained from a reaction between a compound having at least two active hydrogen-containing groups in the molecule and an alkylene oxide, polymer polyols which are modified products of the polyether polyol compounds, urethane modified polyether polyols and polyether ester copolymer polyols.

Examples of the compound having at least two active hydrogen-containing groups in the molecule include polyol compounds such as glycols and glycerin having at least one hydroxyl group in the molecule exemplified by water, ethylene glycol, propylene glycol, butanediol, glycerin, trimethylolpropane, hexane triol, triethanolamine, diglycerin, pentaerythrytol, trimethylolpropane and hexane triol. They may be used alone or in combination of two or more.

Examples of the above alkylene oxide include ethylene oxide, propylene oxide and cyclic ether compounds such as tetrahydrofuran. They may be used alone or in combination of two or more.

The number average molecular weight of the polyether polyol is preferably 400 to 2,000, more preferably 500 to 1,500, most preferably 600 to 1,200 for the same reason as that of the polycarbonate polyol.

The polyether polyol can be acquired industrially as a reagent. Commercially available products thereof include the Excenol (registered trademark) series and Emulstar (registered trademark) of Asahi Glass Co., Ltd. and the Adeka Polyether series of ADEKA Corporation.

<Polyester Polyol>

Examples of the polyester polyol include polyester polyols obtained from a condensation reaction between a polyhydric alcohol and a polybasic acid. Examples of the above polyhydric alcohol include ethylene glycol, 1,2-propanediol, 1,3-butanediol, 1,4-butanediol, 3-methyl-1,5-pentanediol, 1,6-hexanediol, 3,3'-dimethylolheptane, 1,4-cyclohexane dimethanol, neopentyl glycol, 3,3-bis(hydroxymethyl)heptane, diethylene glycol, dipropylene glycol, glycerin and trimethylol propane. They may be used alone or in combination of two or more. Examples of the above polybasic acid include succinic acid, adipic acid, azelaic acid, sebacic acid, dodecanedicarboxylic acid, cyclopentanedicarboxylic acid, cyclohexanedicarboxylic acid, orthophthalic acid, isophthalic acid, terephthalic acid and naphthalene dicarboxylic acid. They may be used alone or in combination of two or more.

The number average molecular weight of the polyester polyol is preferably 400 to 2,000, more preferably 500 to 1,500, most preferably 600 to 1,200 for the same reason as that of the polycarbonate polyol.

These polyester polyols can be acquired industrially as a reagent. Commercially available products thereof include the Polylite (registered trademark) series of DIC Corporation, the Nipporan (registered trademark) series of Nippon Polyurethane Industry Co., Ltd., and the Maximol (registered trademark) series of Kawasaki Kasei Chemicals.

<Component A2: Diisocyanate Compound Having Two Isocyanate Groups in the Molecule>

As the above diisocyanate compound (component A2), aliphatic diisocyanate compounds, alicyclic diisocyanate compounds, aromatic diisocyanate compounds and mixtures thereof are used. Out of these, aliphatic diisocyanate compounds and/or alicyclic diisocyanate compounds are preferably used from the viewpoint of weatherability. Preferably, the aliphatic diisocyanate compound accounts for 30 to 100 mass %, particularly 50 to 100 mass % of the component A2 for the same reason as above.

Examples of the diisocyanate compound which can be preferably used as the component A2 include aliphatic diisocyanate compounds such as tetramethylene-1,4-diisocyanate, hexamethylene-1,6-diisocyanate, octamethylene-1,8-diisocyanate and 2,2,4-trimethylhexane-1,6-diisocyanate; alicyclic diisocyanate compounds such as cyclobutane-1,3-diisocyanate, cyclohexane-1,3-diisocyanate, cyclohexane-1,4-diisocyanate, 2,4-methylcyclohexyl diisocyanate, 2,6-methylcyclohexyl diisocyanate, isophorone diisocyanate, norbornene diisocyanate, isomer mixtures of 4,4'-methylenebis(cyclohexyl isocyanate), hexahydrotoluene-2,4-diisocyanate, hexahydrotoluene-2,6-diisocyanate, hexahydrophenylene-1,3-diisocyanate, hexahydrophenylene-1,4-diisocyanate, 1,9-diisocyanato-5-methylnonane, 1,1-bis(isocyanatomethyl)cyclohexane, 2-isocyanato-4-[(4-isocyanatocyclohexyl)methyl]-1-methylcyclohexane, 2-(3-isocyanatopropyl)cyclohexyl isocyanate and norbornane diisocyanate; and aromatic diisocyanate compounds such as phenyl cyclohexylmethane diisocyanate, isomer mixtures of 4,4'-methylenebis(phenyl isocyanate), toluene-2,3-diisocyanate, toluene-2,4-diisocyanate, toluene-2,6-diisocyanate, phenylene-1,3-diisocyanate, phenylene-1,4-diisocyanate, 1,3-bis(isocyanatomethyl)benzene, xylylene diisocyanate, tetramethyl xylylene diisocyanate, naphthalene diisocyanate, diphenyl ether diisocyanate, 1,3-diisocyanatomethyl benzene, 4,4'-diisocyanato-3,3'-dimethoxy(1,1-biphenyl), 4,4'-diisocyanato-3,3'-dimethylbiphenyl, 1,2-diisocyanatobenzene, 1,4-bis(isocyanatomethyl)-2,3,5,6-tetrachlorobenzene, 2-dodecyl-1,3-diisocyanatobenzene, 1-isocyanato-4-[(2-isocyanatocyclohexyl)methyl]2-methylbenzene, 1-isocyanato-3-[(4-isocyanatophenyl)methyl]-2-methylbenzene, 4-[(2-isocyanatophenyl)oxy]phenyl isocyanate and diphenylmethane diisocyanate.

Of these, at least one diisocyanate compound selected from the group consisting of aliphatic diisocyanate compounds and alicyclic diisocyanate compounds accounts for preferably 30 to 100 mass %, more preferably 50 to 100 mass % of the diisocyanate compound as the component A2 from the viewpoint of the weatherability of the obtained polyurethane urea resin (component (I)) as described above. Preferred examples of the compound include tetramethylene-1,4-diisocyanate, hexamethylene-1,6-diisocyanate, octamethylene-1,8-diisocyanate, 2,2,4-trimethylhexane-1,6-diisocyanate, cyclobutane-1,3-diisocyanate, cyclohexane-1,3-diisocyanate, cyclohexane-1,4-diisocyanate, 2,4-methylcyclohexyl diisocyanate, 2,6-methylcyclohexyl diisocyanate, isophorone diisocyanate, norbornane diisocyanate, isomer mixtures of 4,4'-methylenebis(cyclohexyl isocyanate), hexahydrotoluene-2,4-diisocyanate, hexahydrotoluene-2,6-diisocyanate, hexahydrophenylene-1,3-diisocyanate and hexahydrophenylene-1,4-diisocyanate. These isocyanate compounds may be used alone or in combination of two or more.

<(B) Polyamine Compound Having at Least Two Amino Groups in the Molecule>

The polyamine compound having at least two amino groups in the molecule (component B) is a polyamine compound having at least two amino groups (—$NH_2$ or —NH(R). R is an alkyl group, preferably alkyl group having 1 to 5 carbon atoms) in the molecule.

The component B serves as a chain extender when the polyurethane urea resin (component (I)) is synthesized. By using the component B as a chain extender, a urea bond is introduced into a polyurethane resin to obtain a polyurethane urea resin.

To provide suitable hardness to the obtained polyurethane urea resin (component (I)) and maintain excellent adhesion and heat resistance, the molecular weight of the polyamine compound is preferably 50 to 300, more preferably 50 to 250, most preferably 100 to 220.

As the polyamine compound as the component B, at least one compound selected from the group consisting of diamines and triamines may be preferably used. Examples of the compound which is preferably used as the polyamine compound in the present invention include isophorone diamine, ethylene diamine, 1,2-diaminopropane, 1,3-diaminopropane, 1,2-diaminobutane, 1,3-diaminobutane, 1,4-diaminobutane, 1,5-diaminopentane, 1,6-diaminohexane, piperazine, N,N-bis-(2-aminoethyl)piperazine, bis-(4-aminocyclohexyl)methane, bis-(4-amino-3-butylcyclohexyl)methane, 1,2-, 1,3- and 1,4-diaminocyclohexanes, norbornane diamine, hydrazine, dihydrazine adipate, phenylenediamine, 4,4'-diphenylmethane diamine, N,N'-diethylethylene diamine, N,N'-dimethylethylene diamine, N,N'-dipropylethylene diamine, N,N'-dibutylethylene diamine, N-methylethylene diamine, N-ethylethylene diamine, bis(hexamethylene)triamine and 1,2,5-pentanetriamine.

A diamine compound is particularly preferably used as the polyamine compound from the viewpoints of adhesion and heat resistance. The reason for this is assumed as follows. By using the polyamine compound to synthesize the polyurethane urea resin (component (I)), a urea bond is introduced with the result that the stiffness of the molecule becomes high and a hydrogen bond between molecular chains becomes strong, thereby improving heat resistance. The hydrogen bond between molecular chains becomes strong due to the existence of the urea bond, thereby making it difficult for oxygen contained in air to be dispersed into the polyurethane urea resin (component (I)) with the result that the optical oxidization deterioration of the polyurethane urea resin is suppressed. Further, it is assumed that the reason for the improvement of adhesion is that the hydrogen bond between molecular chains becomes strong due to the existence of the urea bond, thereby rarely causing the cohesive fracture of the resin.

Out of the above polyamine compounds, isophorone diamine, bis-(4-aminocyclohexyl)methane and norbornane diamine are preferably used, and bis-(4-aminocyclohexyl)methane is most preferably used from the viewpoints of water resistance and stability in a perspiration resistance test.

<(C) Compound Having One Group Able to React with an Isocyanate Group in the Molecule>

To synthesize the above polyurethane urea resin, a compound having one group able to react with an isocyanate group in the molecule (component C) is used. By using this component C, a polyurethane urea resin having a capped end of the molecular chain is obtained. Examples of the group able to react with an isocyanate group include amino group (—$NH_2$ group and —NH(R) group), hydroxyl group (—OH group), mercapto group (—SH group: thiol group), carboxyl group [—C(=O)OH group] and acid chloride group [—C(=O)OCl group]. Out of the above components C, a functionality-imparting compound having at least one piperidine structure in the molecule is preferred. As the functionality-imparting compound, a compound having a hindered phenol structure, triazine structure or benzotriazole structure in place of the piperidine structure may be used. What has the most excellent effect is a functionality-imparting compound having a piperidine structure.

By using this functionality-imparting compound, a piperidine structure can be introduced into the polyurethane urea resin (component (I)) with the result that a polyurethane urea resin having excellent optical stabilization, oxidation prevention and ultraviolet absorbing properties (component (I)) can be obtained.

A detailed description is subsequently given of the compound having a piperidine structure as a typical example of the compound used as the component C.

<Compound Having a Piperidine Structure>

As the compound having a piperidine structure used as the component C in the polyurethane urea resin, a compound having a structure represented by the following formula (i) in the molecule can be advantageously used.

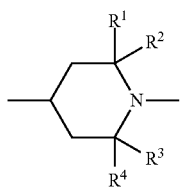

(i)

In the above formula, $R^1$, $R^2$, $R^3$ and $R^4$ are each independently an alkyl group having 1 to 4 carbon atoms, particularly preferably methyl group. A compound having a group able to react with an isocyanate group at the nitrogen atom or the 4-position carbon atom of the above piperidine ring, that is, a compound having a group bonded to any one of the two bonds in the above formula as the group able to react with an isocyanate group is the compound having a piperidine structure. A more specific compound is described hereinbelow.

As the compound which can introduce a piperidine structure into the end of the polyurethane urea resin as the component I in the present invention out of the compounds used as the component C in the present invention, a compound represented by the following formula (1) is preferred.

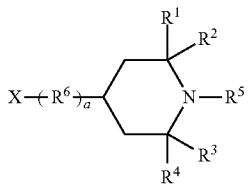

(1)

In the above formula, $R^1$, $R^2$, $R^3$ and $R^4$ are as defined in the above formula (i), $R^5$ is an alkyl group having 1 to 10 carbon atoms or hydrogen atom, $R^6$ is an alkylene group having 1 to 20 carbon atoms or polymethylene group having 3 to 20 carbon atoms, "a" is 0 or 1, and X is a group able to react with an isocyanate group.

In the above formula (1), $R^1$, $R^2$, $R^3$ and $R^4$ are each independently an alkyl group having 1 to 4 carbon atoms. Preferably, four alkyl groups are all methyl groups.

$R^5$ is an alkyl group having 1 to 10 carbon atoms or hydrogen atom. From the viewpoint of acquisition ease, it is preferably an alkyl group having 1 to 4 carbon atoms or hydrogen atom. Since $R^1$ to $R^4$ are alkyl groups having 1 to 4 carbon atoms, even when $R^5$ is a hydrogen atom, the nitrogen atom bonded to $R^5$ does not react with an isocyanate group due to the influence of steric hindrance.

$R^6$ is an alkylene group having 1 to 20 carbon atoms or polymethylene group having 3 to 20 carbon atoms, preferably an alkylene group having 1 to 10 carbon atoms or polymethylene group having 3 to 10 carbon atoms. "a" is the number of $R^6$, s. When "a" is 0, it should be understood that X is directly bonded to the piperidine ring.

X is a group able to react with an isocyanate group, preferably amino group, hydroxyl group, carboxyl group or thiol group. It is particularly preferably an amino group or hydroxyl group from the viewpoints of reactivity with an isocyanate group and acquisition ease.

Examples of the compound represented by the above formula (1) include 1,2,2,6,6-pentamethyl-4-hydroxypiperidine, 1,2,2,6,6-pentamethyl-4-aminopiperidine, 2,2,6,6-tetramethyl-4-hydroxypiperidine, 2,2,6,6-tetramethyl-4-aminopiperidine, 1,2,2,6,6-pentamethyl-4-aminomethylpiperidine and 1,2,2,6,6-pentamethyl-4-aminobutylpiperidine.

<Other Components C>

Besides the above compound having a piperidine structure which is used to improve weatherability, ordinary amines, alcohols, thiols and carboxylic acids may be used as the component C. Since these compounds have one group able to react with an isocyanate group in the molecule, they can deactivate the end of the polyurethane urea resin as the component I.

Out of the other components C used in the present invention, compounds represented by the following formulas (2) and (3) are preferred.

(2)

In the above formula, $R^7$ is an alkyl group having 1 to 20 carbon atoms, aryl group, aralkyl group, alkyloxycarbonyl group or hydrogen atom.

$R^8$ is an alkyl group having 1 to 20 carbon atoms, aryl group, aralkyl group or ester group.

When a compound in which $R^7$ is a hydrogen atom is used as the component C, the end of the polyurethane urea resin as the component (I) is a —NH($R^8$) group which does not react with another polymer and an isocyanate compound substantially. Therefore, the —NH($R^8$) group is not a group able to react with an isocyanate group.

In the above formula (2), $R^7$ is an alkyl group having 1 to 20 carbon atoms, aryl group, aralkyl group, alkyloxycarbonyl group or hydrogen atom. $R^7$ is particularly preferably an alkyl group having 1 to 10 carbon atoms, aryl group, aralkyl group, alkyloxycarbonyl group or hydrogen atom. The above aryl group and aralkyl group may have an alkyl group having 1 to 5 carbon atoms or halogen atom as a substituent.

Preferred examples of $R^7$ include methyl group, ethyl group, normal propyl group, isopropyl group, normal butyl group, tert-butyl group, pentyl group, hexyl group, heptyl group, octyl group, 1,1,3,3-tetramethylbutyl group, phenyl group, benzyl group, 1,1-dimethylbenzyl group, carboxymethyl group, carboxyethyl group, carboxypropyl group and hydrogen atom.

$R^8$ is an alkyl group having 1 to 20 carbon atoms, aryl group, aralkyl group or alkyloxycarbonyl group. $R^8$ is particularly preferably an alkyl group having 1 to 10 carbon atoms, aryl group, aralkyl group or alkyloxycarbonyl group. The above aryl group may have an alkyl group having 1 to 5 carbon atoms or halogen atom as a substituent.

Preferred examples of $R^8$ include methyl group, ethyl group, normal propyl group, isopropyl group, normal butyl group, tert-butyl group, pentyl group, hexyl group, heptyl group, octyl group, 1,1,3,3-tetramethylbutyl group, phenyl group, benzyl group, 1,1-dimethylbenzyl group, carboxymethyl group, carboxyethyl group and carboxypropyl group.

Compounds represented by the following formula (3) may also be advantageously used.

$$Z\text{—}R^9 \qquad (3)$$

In the above formula, $R^9$ is an alkyl group having 1 to 20 carbon atoms, aryl group, aralkyl group or alkyloxycarbonyl group, and Z is a hydroxyl group, carboxyl group or thiol group.

In the above formula (3), $R^9$ is an alkyl group having 1 to 20 carbon atoms, aryl group, aralkyl group or alkyloxycarbonyl group, preferably an alkyl group having 1 to 10 carbon atoms, aryl group, aralkyl group or alkyloxycarbonyl group. The aryl group and the aralkyl group may have an alkyl group having 1 to 5 carbon atoms or halogen atom as a substituent. The preferred group is an alkyl group having 1 to 5 carbon atoms, phenyl group or phenyl group having a halogen atom. Preferred examples of $R^9$ include methyl group, ethyl group, normal propyl group, isopropyl group, normal butyl group, tert-butyl group, pentyl group, hexyl group, heptyl group, octyl group, 1,1,3,3-tetramethylbutyl group, phenyl group, benzyl group, 1,1-dimethylbenzyl group, carboxymethyl group, carboxyethyl group and carboxypropyl group.

Z in the above formula (3) is a group able to react with an isocyanate group, more specifically, hydroxyl group, carboxyl group or thiol group, preferably hydroxyl group.

Examples of the compounds represented by the above formulas (2) and (3) include amines such as methylamine, ethylamine, propylamine, isopropylamine, butylamine, tert-butylamine, pentylamine, hexylamine, heptylamine, 4-heptylamine, octylamine, 1,1-dipropylbutylamine, phenylamine, benzylamine, dimethylamine, diethylamine, dipropylamine, diisopropylamine, dibutylamine, di-tert-butylamine, dipentylamine, dihexylamine, diheptylamine, dioctylamine, methylethylamine, methylbutylamine, methylpentylamine, methylhexylamine, methylheptylamine, methyloctylamine, ethylpropylamine, ethylbutylamine, ethylpentylamine, ethylhexylamine, ethylheptylamine, ethyloctylamine, propylbutylamine, isopropylbutylamine, propylpentylamine, propylhexylamine, propylheptylamine and propyloctylamine; alcohols such as methanol, ethanol, propanol, isopropanol, butanol, 2-butanol, tert-butyl alcohol, pentyl alcohol, hexyl alcohol, heptyl alcohol, octyl alcohol, nonyl alcohol, decanol and 2-decanol; thiols such as methanethiol, ethanethiol, 1-propanethiol, 2-propanethiol, 1-butanethiol, 2-butanethiol, propanethiol, hexanethiol, heptanethiol, octanethiol, dodecanethiol, 2-methyl-1-butanethiol, 2-methylpropanethiol, 3-methyl-2-butenethiol, 1,1-dimethylheptanethiol, cyclohexanethiol, cyclopentanethiol, benzenethiol, benzene methanethiol and 2,6-dimethylbenzenethiol; and carboxylic acids such as acetic acid, propionic acid, butyric acid, pentanoic acid, hexanoic acid, heptanoic acid, octanoic acid, nonanoic acid, decanoic acid and dodecanoic acid.

The above components C may be used alone or in combination of two or more. A compound having a piperidine structure is preferably used to improve the durability of the polyurethane urea resin.

<Contents of Components A1, A2, B and C in Polyurethane Urea Resin>

In the present invention, the ratio of the above components constituting the polyurethane urea resin (component I) in the photochromic composition of the adhesive layer, that is, the components A1, A2, B and C is suitably determined in consideration of the intended use of the polyurethane urea resin. From the viewpoint of balance between the heat resistance and adhesive strength of the obtained polyurethane urea resin, the following ratio is preferred. That is, when the total number of moles of the hydroxyl group contained in the component A1 is represented by n1, the total number of moles of the isocyanate group contained in the component A2 is represented by n2, the total number of moles of the amino group contained in the component B is represented by n3, and the total number of moles of the group able to react with an isocyanate group contained in the component C (specifically, amino group, hydroxyl group, mercapto group and/or carboxyl group) is represented by n4, preferably n1:n2:n3:n4=0.4 to 0.8/1.0/0.19 to 0.59/0.01 to 0.2, particularly preferably n1:n2:n3:n4=0.45 to 0.75/1.0/0.23 to 0.53/0.02 to 0.15, most preferably n1:n2:n3:n4=0.65 to 0.75/1.0/0.23 to 0.33/0.02 to 0.1. n1 to n4 can be each obtained as a product of the number of moles in use of a compound as each component and the number of groups existent in one molecule of the compound.

It is preferred that the above polyurethane urea resin (component (I)) should not have a reactive group at the end. It is particularly preferred that the polyurethane urea resin should be deactivated to prevent the isocyanate group from remaining at the end. To this end, it is preferred to produce the polyurethane urea resin by mixing together the above components to ensure n2=n1+n3+n4. When the total number of moles of n1, n3 and n4 (n1+n3+n4) is larger than n2, unreacted components A1, B and C can be removed by re-precipitation.

<Polyurethane Urea Resin Having a Polydispersity (Weight Average Molecular Weight/Number Average Molecular Weight Ratio) of 1.6 to 2.4>

In the present invention, as the polyurethane urea resin used in the photochromic composition, a polyurethane urea resin having a polydispersity (weight average molecular weight/number average molecular weight ratio) of 1.6 to 2.4 is preferably used. When a laminate is manufactured by bonding polycarbonate optical sheets or films by means of an adhesive layer composed of a photochromic composition comprising a polyurethane urea resin having this narrow range of polydispersity, the obtained laminate exhibits excellent adhesion, especially excellent adhesion at a high temperature, and excellent photochromic properties. Further, the obtained laminate has high perspiration resistance. That is, even after it is brought into contact with artificial perspiration, the laminate exhibits excellent adhesion. Although the details of the reason that this effect is obtained are unknown, the inventors of the present invention assume it as follows. That is, since the polydispersity (weight average molecular weight/number average molecular weight ratio) is 1.6 to 2.4, the content of a low-molecular weight polyurethane urea can be reduced, thereby stabilizing heat resistance. Further, the reduction of physical interaction between molecules, that is, intertwining between the molecules of a polymer chain due to the influence of the low-molecular weight polyurethane urea can be suppressed and fracture, that is, cohesive fracture in the polyurethane urea layer can be suppressed when the polyurethane urea resin is used in the adhesive layer, thereby improving adhesion.

As the polydispersity becomes lower, that is, closer to 1.0, the effect of the present invention tends to appear more markedly. It is substantially difficult to obtain a polyurethane urea resin having a polydispersity of less than 1.6 with an industrial-scale production method. When the polydispersity exceeds 2.4, the softening start temperature tends to become low due to the influence of the low-molecular weight polyurethane urea resin. Therefore, as compared with a resin having a narrow polydispersity range, this polyurethane urea resin tends to deteriorate in heat resistance and adhesion at a high temperature. Due to the influence of a high-molecular weight polyurethane urea resin, viscosity rises considerably at the time of dissolving in an organic solvent as compared with the resin having a narrow polydispersity range, thereby making coating difficult. From the viewpoints of excellent adhesion, heat resistance and coatability, the polydispersity of the polyurethane urea resin of the present invention is more preferably 1.8 to 2.2.

The molecular weight of the polyurethane urea resin of the present invention is not particularly limited if the polydispersity satisfies the above range. From the viewpoints of adhesive strength, heat resistance and perspiration resistance, it is recommended that the number average molecular weight of the polyurethane urea resin should be preferably 5,000 to 100,000, more preferably 8,000 to 50,000, particularly preferably 10,000 to 40,000.

The number average molecular weight and the weight average molecular weight of the above polyurethane urea resin are values obtained by measuring a 1.0% dimethyl formamide (DMF) solution of a polyurethane urea resin sample by using a gel permeation chromatograph (GPC) in terms of polyethylene oxide, two Shodex KD-806M columns connected in series (manufactured by Showa Denko K.K.), a LiBr (10 mmol/L)/DMF solution as an elute and a RI detector at a flow rate of 1 ml/min and calculating with the Empower Personal GPC Option GPC analyzing software of Nihon Waters K.K. The polydispersity is a weight average molecular weight/number average molecular weight ratio and a value calculated from number average molecular weight and weight average molecular weight obtained by the above method.

To obtain the polyurethane urea resin (component I) of the present invention by reacting the above components A1, A2 and B and optionally the component C, they should be reacted with one another to achieve the above range of polydispersity, and so-called "one-shot method" or "prepolymer method" may be employed. However, to obtain the polyurethane urea resin efficiently by controlling the polydispersity, the prepolymer method is preferred. According to the production method which will be described hereinafter, the polyurethane urea resin having the above range of polydispersity can be easily produced.

The above polyurethane urea resin (component (I)) may also be used in the adhesive layer containing no photochromic compound.

<Method of Producing Polyurethane Urea Resin>
<Method of Producing Urethane Prepolymer (A)>

In the present invention, the polyurethane urea resin used in the photochromic composition can be generally produced from a reaction between a urethane prepolymer and a polyamine such as diamine. The urethane prepolymer (component A) can be produced by reacting the above polyol compound (component A1) with the above diisocyanate compound (component A2) (to be also referred to as "prepolymer reaction" hereinafter).

The urethane prepolymer (component A) of the present invention is preferably a urethane prepolymer having an isocyanate group at the end by making $n1:n2=0.4/1.0$ to $0.8/1.0$ when the total number of moles of the hydroxyl group contained in the component A1 is represented by $n1$ and the total number of moles of the isocyanate group contained in the component A2 is represented by $n2$.

The addition order of the component A1 and the component A2 when they are reacted with each other is not particularly limited. The component A1 and the component A2 may be added additionally during the reaction as required.

The reaction between the component A1 and the component A2 is preferably carried out in the presence or absence of an organic solvent in an inert gas atmosphere such as nitrogen or argon at a reaction temperature of 70 to 130° C. When the reaction temperature is lower than 70° C., the reaction is not completed and when the reaction temperature is higher than 130° C., part of the component A1 decomposes and therefore a polyurethane urea resin having desired physical properties cannot be obtained. The reaction time which changes according to the charge ratio of the component A1 and the component A2 and the reaction temperature may be set to a range of 0.5 to 24 hours.

As the organic solvent, organic solvents such as acetone, methyl ethyl ketone, methyl isobutyl ketone, diethyl ketone, cyclohexanone, dioxane, toluene, hexane, heptane, ethyl acetate, butyl acetate, dimethyl formamide (DMF), dimethyl sulfoxide (DMSO) and tetrahydrofuran (THF) may be used. These organic solvents may be used alone or in combination of two or more.

When the organic solvent is used, the amount thereof is preferably not more than 200 parts by mass based on 100 parts by mass of the total of the component A1 and the component A2. When the amount of the organic solvent is larger than 200 parts by mass, the reaction time between the component A1 and the component A2 becomes long and part of the component A1 may decompose.

To prevent a reaction between the isocyanate group contained in the diisocyanate compound and water which is an impurity during the reaction, the reaction reagents and the solvent are preferably dehydrated and fully dried in advance. To carry out the above reaction, a catalyst such as dibutyltin dilaurate, dimethyl imidazole, triethylenediamine, tetramethyl-1,6-hexadiamine, tetramethyl-1,2-ethanediamine or 1,4-diazabicyclo[2.2.2]octane may be used. The amount of the catalyst is preferably 0.001 to 1 part by mass based on 100 parts by mass of the total of the component A.

<Method of Producing Polyurethane Urea Resin>

The polyurethane urea resin can be produced from a reaction between the urethane prepolymer and a polyamine such as diamine. When the urethane prepolymer is produced by the above method, the polyamine compound as the component B is added to the reaction solution after the above prepolymerization reaction, thereby making it possible to produce the polyurethane urea resin continuously.

Other reaction conditions in the above method of producing the polyurethane urea resin are suitably determined in consideration of production equipment. In general, the reaction can be carried out in the presence of an organic solvent in an inert gas atmosphere such as nitrogen or argon as required at a reaction temperature of −20 to 40° C., preferably −10 to 20° C.

Examples of the organic solvent used in the production of the above polyurethane urea resin include alcohol-based organic solvents such as acetone, methyl ethyl ketone, methyl isobutyl ketone, diethyl ketone, cyclohexanone, dioxane, toluene, hexane, heptane, ethyl acetate, butyl acetate, dimethylformamide (DMF), dimethyl sulfoxide (DMSO), tetrahydrofuran (THF), methanol, ethanol, isopropyl alcohol, t-butanol, 2-butanol, n-butanol, ethylene glycol monomethyl ether, ethylene glycol monoethyl ether, ethylene glycol mononormal propyl ether, ethylene glycol monoisopropyl ether, ethylene glycol monobutyl ether, ethylene glycol mono-t-butyl ether, propylene glycol monomethyl ether, propylene glycol monoethyl ether, propylene glycol mononormal propyl ether, propylene glycol monoisopropyl, propylene glycol mononormal butyl ether and propylene glycol mono-t-butyl ether. These organic solvents may be used alone or in combination of two or more.

The amount of the above organic solvent is preferably 130 to 800 parts by mass, more preferably 150 to 500 parts by mass based on 100 parts by mass of the total of the finally obtained polyurethane urea resin from the viewpoints of carrying out the reaction efficiently and the influence of the remaining organic solvent.

To prevent a reaction between the isocyanate group and water as an impurity in the reaction system during the reaction, the reaction reagents and the organic solvent are preferably dehydrated and fully dried in advance. To carry out the above reaction, a catalyst such as dibutyltin dilaurate, dimethyl imidazole, triethylene diamine, tetramethyl-1,6-hexadiamine, tetramethyl-1,2-ethanediamine or 1,4-diazabicyclo[2,2,2]octane may be newly added. When the catalyst is used in the prepolymer reaction, it may be used as it is without being removed. The amount of the catalyst is preferably 0.001 to 1 part by mass based on 100 parts by mass of the total of the polyurethane urea resin, To synthesize the above polyurethane urea resin (component (I)), a compound having one group able to react with an isocyanate group in the molecule (component C) is used. By using this component C, a polyurethane urea resin having the capped end of the molecular chain is obtained.

As means for obtaining the polyurethane urea resin having the capped end of the molecular chain (may also be referred to as "terminal modification reaction" hereinafter), there is a preferred method in which the component C which has been diluted with an organic solvent as required is added dropwise to a reaction solution containing the polyurethane urea resin having an isocyanate group at the end dissolved in an organic solvent after the end of the reaction between the component A and the component B. When the alcohol-based organic solvent added during the reaction between the component A and the component B is used as the component C for the terminal modification reaction, the component C does not need to be newly added.

The above terminal modification reaction is carried out in the presence of an organic solvent in an inert gas atmosphere such as nitrogen or argon as required. The reaction temperature is −20 to 30° C. which is the same temperature as that for the reaction between the component A and the component B when the group able to react with an isocyanate group contained in the component C is an amino group. When the group able to react with the isocyanate group contained in the component C is not an amino group, the reaction temperature is preferably higher than 30° C. and not higher than 130° C. as the reaction rate with the isocyanate group is low.

The reaction time is 0.5 to 3 hours when the group able to react with the isocyanate group contained in the component C is an amino group and 1 to 24 hours when the group able to react with the isocyanate group contained in the component C is not an amino group.

As the organic solvent, the same organic solvent as that used in the above prepolymer reaction and the reaction between the component A and the component B may be used. As a matter of course, the terminal modification reaction may be carried out while the organic solvent used in the above prepolymer reaction and the reaction between the component A and the component B is contained.

The amount of the organic solvent in the terminal modification reaction is preferably 130 to 800 parts by mass based on 100 parts by mass of the finally obtained component A.

To prevent a reaction between the isocyanate group and water as an impurity in the reaction system during the reaction, the reaction reagents and the organic solvent are preferably dehydrated and fully dried in advance. To carry out the above reaction, a catalyst such as dibutyltin dilaurate, dimethyl imidazole, triethylene diamine, tetramethyl-1,6-hexadiamine, tetramethyl-1,2-ethanediamine or 1,4-diazabicyclo[2,2,2]octane may be newly added. When the catalyst is used till the prepolymer reaction, it may be used as it is without being removed. The amount of the catalyst is preferably 0.001 to 1 part by mass based on 100 parts by mass of the total of the component A.

<Method of Producing Polyurethane Urea Resin Having a Polydispersity (Weight Average Molecular Weight/Number Average Molecular Weight Ratio) of 1.6 to 2.4>

To produce the polyurethane urea resin having a polydispersity (weight average molecular weight/number average molecular weight ratio) of 1.6 to 2.4 as described above, the time ($\theta_M$) for mixing together the component A and the component B completely is set to preferably not more than 30 seconds, more preferably not more than 15 seconds when the urethane prepolymer (component A) and the polyamine compound (component B) are reacted with each other, thereby making it possible to obtain a polyurethane urea resin having a polydispersity (weight average molecular weight/number average molecular weight) of 1.6 to 2.4.

The complete mixing time ($\theta_M$) is an index indicative of mixing characteristics in a stirring tank (such as a reaction vessel) and obtained from "$n \cdot \theta_M$–Re curve" which shows the relationship between $n \cdot \theta_M$ (n is the revolution of a stirring blade (1/sec)) and Re (Reynolds number; index indicative of the turbulence of a liquid). As for the complete mixing time ($\theta_M$) and the $n \cdot \theta_M$–Re curve, refer, for example, to "Technical Report Vol. 35, No. 104, p. 74-78, August, 1987 of Sumitomo Heavy Industries, Ltd.", JP-A 61-200842 and JP-A 6-312122.

As means for setting the complete mixing time ($\theta_M$) to not more than 30 seconds, any suitable method is employed. For example, a method in which a baffle plate is installed in a stirring tank (such as a reaction vessel) to cause turbulence, or a method in which an arbitrary suitable stirring blade is used is employed. Examples of the suitable stirring blade include max blend blade and full-zone blade.

When the urethane prepolymer is produced by the above method, the component B is added to the reaction solution after the prepolymerization reaction, thereby making it possible to produce the polyurethane urea resin continuously.

Other reaction conditions in the method of producing the polyurethane urea resin having the above range of polydispersity are suitably determined in consideration of production equipment. From the viewpoint of obtaining a polyurethane urea resin having the narrow range of polydispersity, the reaction is preferably carried out in the presence of an organic solvent in an inert gas atmosphere such as nitrogen or argon as required at a reaction temperature of preferably −20 to 40° C., more preferably −10 to 20° C. When the reaction temperature is lower than −20° C., viscosity rises in the latter half stage of a chain extension reaction with the result that stirring may become unsatisfactory. When the reaction temperature is higher than 40° C., a urea bond formation reaction becomes fast, a heterogeneous reaction may occur as the component A and the component B react with each other upon contact with each other, and polydispersity tends to become wide. A reaction time at the above reaction temperature of 0.5 to 3 hours suffices.

A description is subsequently given of the photochromic compound (II) used in the present invention.

<(II) Photochromic Compound>

In the present invention, as the photochromic compound (II), known photochromic compounds such as chromene compounds, fulgimide compounds, spirooxazine compounds and spiropyran compounds may be used. They may be used alone or in combination of two or more.

Examples of the above fulgimide compounds, spirooxazine compounds, spiropyran compounds and chromene compounds include compounds disclosed by JP-A 2-28154, JP-A 62-288830, WO94/22850 and WO96/14596.

Out of these photochromic compounds, at least one chromene compound having an indeno(2,1-f)naphtho(2,1-b)pyran skeleton is preferably used from the viewpoints of photochromic properties such as color optical density, initial coloration, durability and fading speed. A chromene compound having a molecular weight of not less than 540 is more preferred as it is particularly excellent in color optical density and fading speed.

Examples of the photochromic compound which can be particularly preferably used in the present invention are given below.

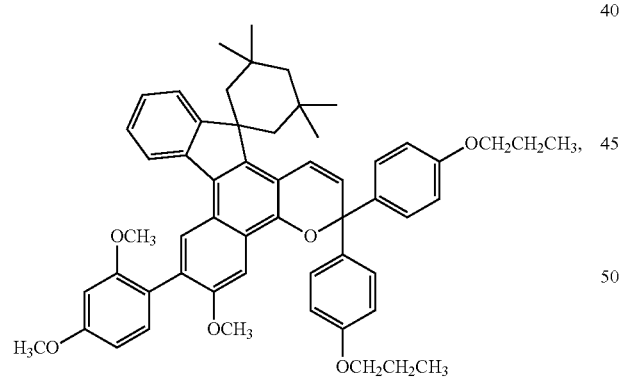

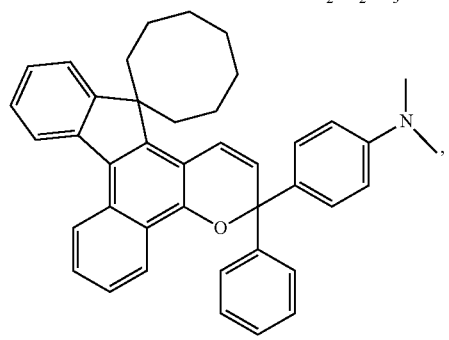

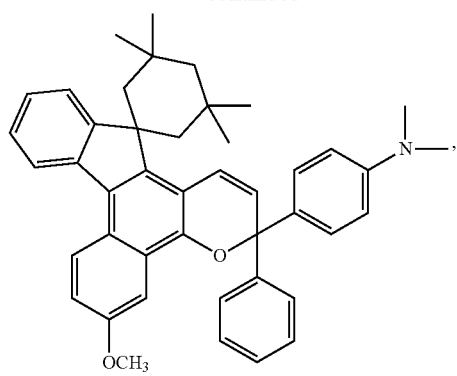

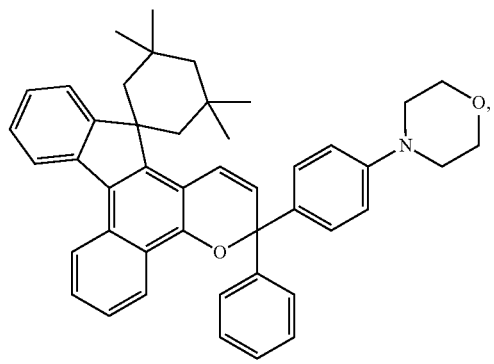

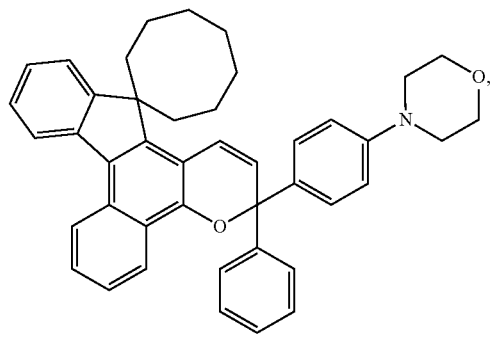

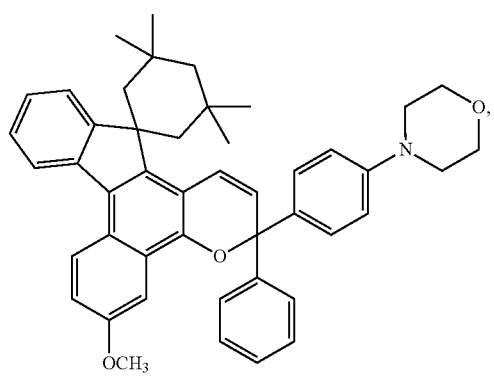

-continued

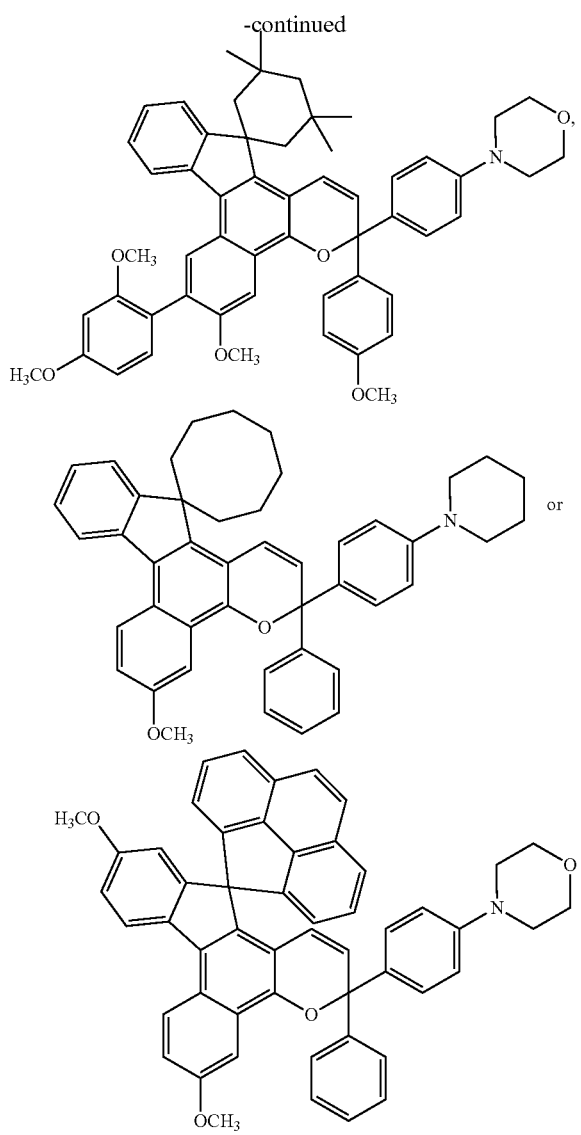

In the present invention, the amount of the photochromic compound (II) is preferably 0.1 to 20.0 parts by mass based on 100 parts by mass of the polyurethane urea resin (I) from the viewpoints of photochromic properties. When the above amount is too small, satisfactory color optical density and durability may not be obtained. When the above amount is too large, depending on the type of the photochromic compound, the photochromic compound hardly dissolves in the photochromic composition, whereby the composition tends to deteriorate in homogeneity and bonding strength (adhesive strength). To fully keep high adhesion to the polycarbonate optical sheets or films of the present invention while retaining photochromic properties such as color optical density and durability, the amount of the photochromic compound (II) is preferably 0.5 to 10.0 parts by mass, particularly preferably 1.0 to 7.0 parts by mass based on 100 parts by mass of the polyurethane urea resin (I). When the photochromic composition is mixed with the component (III) which will be described hereinafter, the amount of the photochromic compound (II) is preferably 0.1 to 20.0 parts by mass, more preferably 0.5 to 10.0 parts by mass, much more preferably 1.0 to 7.0 parts by mass based on 100 parts by mass of the total of the polyurethane urea resin (I) and the component (III).

A description is subsequently given of the polyisocyanate compound having at least two isocyanate groups in the molecule (III) which is preferably used in the photochromic composition of the present invention.

<(III) Polyisocyanate Compound Having at Least Two Isocyanate Groups in the Molecule>

The adhesive or closely adhesive strength of the laminate of the present invention can be further improved when the photochromic composition used in the adhesive layer comprises a product obtained by reacting the above polyurethane urea resin (I) with the polyisocyanate compound having at least two isocyanate groups in the molecule (III) (to be simply referred to as "component (III)" hereinafter).

When at least two isocyanate groups are contained in the molecule of the component (III), the component (III) reacts with the polyurethane urea resin (I), thereby making it possible to produce a polyurethane urea resin having a crosslinked structure at the time of forming the adhesive layer composed of the photochromic composition. Or/further, an isocyanate group(s) contained in the molecule of the component (III) hydrolyze(s) to become an amine which reacts with an isocyanate group(s) contained in the molecule of another component (III), thereby making it possible to produce a urea resin in the component (I). It is considered that the heat resistance of the polyurethane urea resin improves and cohesive fracture hardly occurs since this crosslinked structure and/or the new urea resin are/is formed in the polyurethane urea resin (I). Therefore, it is considered that the effect of improving adhesion becomes large. This effect is greater than when an ordinary two-liquid polyurethane resin is used. However, when operation ease and the viscosity and storage stability of the obtained photochromic composition are taken into consideration, the component (III) preferably has 2 to 3 isocyanate groups in the molecule.

To form an adhesive layer composed of the photochromic composition and having excellent adhesion, compounds having an isocyanate group bonded to a secondary carbon are preferably used as the component (III). They may be used alone or in combination of two or more. The advantage obtained by using the component (III) having an isocyanate group bonded to a secondary carbon is the great effect of improving heat resistance and adhesion.

In addition, polyisocyanate compounds having a relatively flexible group (group having high mobility) and at least two isocyanate groups in the molecule may be used as the above component (HI). Heat resistance and adhesion can be improved by using at least one polyisocyanate compound (may be simply referred to as "component (IIIB)" hereinafter) selected from the group consisting of hexamethylene diisocyanate, burette compounds of hexamethylene diisocyanate, isocyanurate compounds of hexamethylene diisocyanate and adduct compounds of hexamethylene diisocyanate. The polyisocyanate compounds (IIIB) having a relatively flexible group (group having high mobility) and at least two isocyanate groups in the molecule may be used alone or in combination of two or more.

In the present invention, the effect of improving heat resistance and adhesion when the component (III) is added to the component (I) is obtained after a laminate is produced by using the photochromic composition comprising these. Stated more specifically, it is considered that, after a laminate is produced by using a photochromic composition comprising the component (I) and the component (III), the effect of improving heat resistance and adhesion is obtained by supplying heat and moisture. That is, one isocyanate group of the component (III) reacts with the urethane bond or urea bond of the component (I) by heat. Then, it is considered that, in a moisture reaction (reaction in the presence of water), the remaining isocyanate group(s) of the component (III) bonded to the component (I) and an isocyanate group(s) of a component (III) remaining free hydrolyze by moisture to produce an amine, thereby causing a crosslinking reaction. Or/further, it is considered that a isocyanate group(s) of the component (III) remaining free hydrolyze(s) by moisture to produce an amine which reacts with an isocyanate group(s) of another component (III) remaining free to produce a new urea resin in the component (I).

By using at least one compound having an isocyanate group bonded to a secondary carbon (component (IIIA)) and a polyisocyanate compound (component (IIIB)) having a relatively flexible group (group having high mobility) and at least two isocyanate groups in the molecule in combination as the above component (III), adhesion can be further improved.

Examples of the preferred compound having an isocyanate group bonded to a secondary carbon (component IIIA) as the above component (III) include isomer mixtures of 4,4'-methylenebis(cyclohexyl isocyanate), cyclobutane-1,3-diisocyanate, cyclohexane-1,3-diisocyanate, cyclohexane-1,4-diisocyanate, hexahydrotoluene-2,4-diisocyanate, hexahydrotoluene-2,6-diisocyanate, hexahydrophenylene-1,3-diisocyanate, hexahydrophenylene-1,4-diisocyanate and trimers of isophorone diisocyanate (isocyanurate compounds). Out of these, isomer mixtures of 4,4'-methylenebis (cyclohexyl isocyanate) are preferably used.

Preferred examples of the polyisocyanate compound having a relatively flexible group (group having high mobility) and at least two isocyanate groups in the molecule include hexamethylene diisocyanate, burette compounds of hexamethylene diisocyanate, isocyanurate compounds of hexamethylene diisocyanate, and adduct compounds of hexamethylene diisocyanate (component (IIIB)). Out of the components (IIIB), a polyisocyanate compound selected from the group consisting of burette compounds of hexamethylene diisocyanate and isocyanurate compounds of hexamethylene diisocyanate is preferably used.

Although the above component (IIIA) and the above component (IIIB) may be used alone, they are preferably used in combination to further improve adhesion. The above component (IIIA) and the above component (IIIB) are particularly preferably used in combination. When they are used in combination, the amount of the component (IIIB) is preferably 20 to 150 parts by mass based on 100 parts by mass of the component (IIIA) to enhance the effect. To further improve adhesion, the amount of the component (IIIB) is preferably 20 to 100 parts by mass, more preferably 30 to 80 parts by mass based on 100 parts by mass of the above component (IIIA).

In the photochromic composition used in the laminate of the present invention, the molecular weight of the component (III) is not particularly limited but preferably lower than 1,000. When the molecular weight of the component (III) is not lower than 1,000, the heat resistance and film strength of the adhesive layer composed of the obtained photochromic composition tend to deteriorate. This is considered that when the component (III) having a high molecular weight is used, the number of bonds between isocyanate groups tends to increase and even when a crosslinked structure is formed, the distance between crosslink points becomes long with the result that heat resistance does not improve much and therefore, adhesion does not improve much as well. Therefore, the molecular weight of the component (III) is preferably lower than 1,000, more preferably not higher than 800, most preferably not higher than 500. This component (III) is preferably not a polymer as described above. Therefore, the molecular weight of the component (III) is the molecular weight of the component (III) itself. The lower limit of the molecular weight of the component (III) is the molecular weight of the individual compound and not particularly limited but preferably 100.

In the laminate of the present invention, the amount of the component (III) in the photochromic composition is preferably 4.0 to 20.0 parts by mass based on 100 parts by mass of the component (I) from the viewpoints of adhesion, heat resistance, perspiration resistance and photochromic properties. When the amount of the component (III) falls within this range, the obtained photochromic composition exhibits an excellent effect. When the above amount is too small, the effect of improving adhesion and heat resistance may not be obtained. When the amount is too large, the adhesive layer obtained from the photochromic composition may become cloudy, adhesion may deteriorate, and the durability of photochromic compound may degrade. To improve adhesion to an optical substrate such as a plastic film while retaining photochromic properties such as color optical density and durability, the amount of the component (III) is preferably 6.0 to 17.5 parts by mass, more preferably 7.0 to 15.0 parts by mass based on 100 parts by mass of the polyurethane urea resin (I). When a plurality of components (III) are used, the total amount of the components (III) should satisfy the above range.

The amount of the isocyanate group of the component (III) is preferably 1.0 to 10.0 parts by mass, more preferably 1.5 to 6.0 parts by mass, most preferably 2.0 to 5.0 parts by mass based on 100 parts by mass of the component (I). The amount of the isocyanate group can be obtained from the molecular weight of the component (III), the number of isocyanate groups per molecule and the molecular weight of the isocyanate group. As a matter of course, when a plurality of components (III) are used, the total amount of the isocyanate groups of the components (III) should satisfy the above amount of the isocyanate group.

The heat resistance of a reaction product between the polyurethane urea resin (I) and the component (III) is preferably 60 to 200° C., more preferably 100 to 200° C., much more preferably 100 to 190° C., particularly preferably 120 to 190° C., most preferably 150 to 190° C. from the viewpoints of (i) the physical properties of a laminate obtained by attaching polycarbonate optical sheets or films and a third optical sheet or film which will be described hereinafter, (ii) processing stability when an optical article is produced from the obtained laminate by bending and injection molding, (iii) the adhesion of the obtained laminate and (iv) workability at the time of applying a hard coat solution and curing it when a hard coat layer is formed on the surface of the laminate or optical article. Heat resistance in the present invention means a softening point measured by using a thermomechanical measuring instrument (TMA120C of Seiko Instruments Inc.) under the following conditions.

[Measuring Conditions] Temperature Elevation Rate: 10° C./Min, Measurement Temperature Range: 30 to 200° C., Probe: Needle Probe Having an End Diameter of 0.5 mm<Characteristic Properties of Preferred Photochromic Composition>

To make the laminate of the present invention exhibit excellent adhesion and photochromic properties, the heat resistance of the adhesive layer composed of the above photochromic composition is preferably not lower than 100° C.

When the above photochromic composition does not comprise the above component (III), the heat resistance of the above polyurethane urea resin (I) is preferably not lower than 100° C., more preferably 100 to 190° C.

To make the laminate of the present invention exhibit excellent characteristic properties, the above photochromic composition preferably comprises the polyurethane urea resin (I) having a heat resistance of 80° C. or higher to lower than 120° C., the component (III) and the photochromic compound (II). The heat resistance of the adhesive layer composed of the photochromic composition is preferably not lower than 100° C., more preferably 100 to 190° C., much more preferably 120 to 190° C., particularly preferably 150 to 190° C.

The polyurethane urea resin (I) having a heat resistance of 80° C. or higher to lower than 120° C. is considered as soft. By using this polyurethane urea resin (I) as a base resin, excellent photochromic properties can be obtained while certain heat resistance is retained. Further, it is considered that a composition comprising the soft polyurethane urea resin (I) and the above component (III) has improved adhesion to the polarizing film layer, thereby improving adhesion to another optical film (sheet). In addition, since the effect of improving heat resistance and adhesion by adding the component (III) is obtained after the production of the laminate as described above, a laminate having excellent characteristic properties is obtained. The heat resistance of the adhesive layer composed of the photochromic composition in the laminate is preferably not lower than 100° C., more preferably 100 to 190° C., much more preferably 120 to 190° C., particularly preferably 150 to 190° C. as described above.

<Other Components>

Additives such as organic solvent, surfactant, antioxidant, radical scavenger, ultraviolet stabilizer, ultraviolet absorbent, release agent, coloring inhibitor, antistatic agent, fluorescent dye, dye, pigment, aroma chemical and plasticizer may be added to the photochromic composition used in the laminate of the present invention in order to improve the durability, color development speed and fading speed of the photochromic compound (II) and film forming properties. Any known compounds may be used as the additives.

Examples of the organic solvent include alcohols such as methanol, ethanol, n-propanol, i-propanol, 2-pentanol, 3-pentanol, 3-methyl-2-butanol, 4-methyl-2-pentanol, n-butanol, t-butanol, 2-butanol, t-pentyl alcohol and 2,2,2-trifluoroethanol; polyhydric alcohol derivatives such as ethylene glycol monomethyl ether, ethylene glycol monoisopropyl ether, ethylene glycol monoethyl ether, ethylene glycol mono-n-propyl ether, ethylene glycol mono-n-butyl ether, ethylene glycol mono-t-butyl ether, propylene glycol monomethyl ether, propylene glycol monoethyl ether, propylene glycol-n-butyl ether and ethylene glycol dimethyl ether; diacetone alcohol; ketones such as methyl ethyl ketone, diethyl ketone, n-propyl methyl ketone, methyl isobutyl ketone, diisopropyl ketone and n-butylmethyl ketone; toluene; hexane; heptane; acetates such as ethyl acetate, 2-methoxyethyl acetate and 2-ethoxyethyl acetate; dimethyl formamide (DMF); dimethyl sulfoxide (DMSO); tetrahydrofuran (THF); cyclohexanone; chloroform; dichloromethane and combinations thereof.

The surfactant may be nonionic, anionic or cationic. A nonionic surfactant is preferably used from the viewpoint of solubility in the photochromic composition. Preferred examples of the nonionic surfactant include sorbitan fatty acid esters, glycerin fatty acid esters, decaglycerin fatty acid esters, propylene glycol•pentaerythritol fatty acid esters, polyoxyethylene sorbitan fatty acid esters, polyoxyethylene sorbit fatty acid esters, polyoxyethylene glycerin fatty acid esters, polyethylene glycol fatty acid esters, polyoxyethylene alkyl ethers, polyoxyethylene phytosterol•phytostanol, polyoxyethylene polyoxypropylene alkyl ethers, polyoxyethylene alkylphenyl ethers, polyoxyethylene castor oil•hardened castor oil, polyoxyethylene lanoin•lanolin alcohol•beeswax derivatives, polyoxyethylene alkyl amine•fatty acid amides, polyoxyethylene alkylphenyl formaldehyde condensates, single-chain polyoxyethylene alkyl ethers and silicone-based and fluorine-based surfactants.

The surfactants may be used alone or in combination of two or more. The amount of the surfactant is preferably 0.001 to 5 parts by mass based on 100 parts by mass of the polyurethane urea resin (I).

As the antioxidant, radical scavenger, ultraviolet stabilizer and ultraviolet absorbent, hindered amine optical stabilizers, hindered phenol antioxidants, phenol-based radical scavengers, sulfur-based antioxidants, phosphorus-based antioxidants, triazine-based compounds benzotriazole-based compounds and benzophenone-based compounds may be preferably used. These antioxidants, radical scavengers, ultraviolet stabilizers and ultraviolet absorbents may be used in combination of two or more. To use these additives, the surfactant may be used in combination with the antioxidant, the radical scavenger, the ultraviolet stabilizer or the ultraviolet absorbent. The amounts of the antioxidant, the radical scavenger, the ultraviolet stabilizer and the ultraviolet absorbent are each preferably 0.001 to 20 parts by mass based on 100 parts by mass of the polyurethane urea resin (I). If these additives are used too much, the adhesion to a polycarbonate resin sheet or film of the photochromic composition deteriorates. Therefore, the amounts of these additives are each preferably not more than 7 parts by mass, more preferably not more than 3 parts by mass, most preferably not more than 1 part by mass.

<Method of Producing Photochromic Composition>

The photochromic composition used in the laminate of the present invention can be produced by mixing together the above polyurethane urea resin (I), the photochromic compound (II) and other components. The order of mixing these components is not particularly limited.

For example, these components are melt kneaded together to obtain a photochromic composition which may be then pelletized or molded into a sheet. When an organic solvent is used, a photochromic composition can be obtained by dissolving these components in the organic solvent.

The photochromic composition obtained as described above can be advantageously used as a photochromic adhesive, especially a photochromic adhesive for bonding the polycarbonate optical sheets or films of the present invention or a third optical sheet or film which will be described hereinafter. The laminate of the present invention can be easily obtained by bonding the polycarbonate optical sheets or films and the third optical sheet or film which will be described hereinafter through the adhesive layer composed of the photochromic composition.

The thickness of the adhesive layer composed of the photochromic composition is suitably determined according to intended use. In consideration of photochromic properties, it is preferably 1 to 100 μm.

The third optical sheet or film may be used in the laminate of the present invention besides a pair of opposed polycarbonate optical sheets or films. A description is subsequently given of the third optical sheet or film used in the present invention.

<Third Optical Sheet or Film>

In the present invention, as the third optical sheet or film, the above-described polycarbonate optical sheet or film and a cellulose triacetate film are preferably used.

When the third optical sheet or film in the present invention is formed between the polarizing film layer and the photochromic adhesive layer, the adhesion of the laminate of the present invention can be made high and the excellent photochromic properties and polarization properties of the laminate of the present invention can be retained. That is, as compared with a case in which an adhesive layer comprising a photochromic composition is directly bonded to the surface of a polarizing film (may be referred to as "direct bonding" hereinafter) like technology disclosed by JP-A 2002-062423, high photochromic and polarization properties can be retained without being affected by heating in the production process.

For example, when a laminate film including a laminate film composed of a polyvinyl alcohol polarizing film dyed with iodine which is one of typical polarizing films and an adhesive layer comprising a photochromic compound disposed on the polarizing film is heated, iodine is diffused into the adhesive layer from the polarizing film due to the high sublimability of iodine, whereby the polarization performance of the laminate film tends to deteriorate.

Further, when a plasticizer is contained in the polyvinyl alcohol polarizing film to improve moldability in the case of direct bonding, the plasticizer serves as a solvent and the diffusion of the photochromic compound into the polarizing film from the adhesive layer tends to increase by heating. The photochromic compound comes into contact with iodine to be oxidized by this mechanism, whereby the photochromic performance of the photochromic compound tends to deteriorate.

In this respect, the inventors of the present invention confirmed the following fact through experiments. That is, it was confirmed that, when an organic solvent containing 100 parts by mass of a photochromic compound, specifically 6'-(2,3-dihydro-1H-indol-1yl)-1,3-dihydro-3,3-dimethyl-1-propyl-spiro[2H-indol-2,3'-(3H)-naphtho(2,1-b) (1,4)oxazine] (trade name: Reversacol Midnight Grey: manufactured by James Robinso Ltd.) and 1 part by mass of iodine was heated, the color optical density of the organic solvent corresponding to the color optical density of the photochromic compound became lower than the color optical density of the organic solvent before iodine was added.

Therefore, the laminate of the present invention preferably has the third optical sheet or film between the polarizing film layer and the adhesive layer composed of the photochromic composition. In this case, a problem that the above photochromic compound or the dye moves does not occur.

The thus obtained laminate of the present invention may be used as a sunglass lens, sport goggles or polarizing lens such as spectacle lens for correction. These lenses function as sunglasses as they are colored swiftly outdoors where they are irradiated with light including ultraviolet light such as sunlight and as ordinary eyeglasses as they are faded to become transparent indoors where there is no light irradiation.

In the present invention, when a cellulose triacetate film is used as the third optical sheet or film, the thickness thereof is preferably 20 to 200 µm, more preferably 20 to 100 µm. Since a film having a thickness of less than 20 µm has low film strength, it is easily broken during processing and a film having a thickness of more than 200 µm is very expensive.

An adhesive layer containing no photochromic compound (to be simply referred to as "adhesive layer" hereinafter) may also be used in the laminate of the present invention when the optical sheets or films, the polarizing film and the adhesive layer composed of the photochromic composition are bonded. This adhesive layer does not contain a photochromic compound unlike the above adhesive layer composed of the photochromic composition. A description is subsequently given of the adhesive layer used in the present invention.

<Adhesive Layer; Adhesive Layer Containing No Photochromic Compound>

As the above adhesive layer used in the laminate of the present invention, any known adhesive layer which is used to bond an optical sheet or film and a polarizing film may be used. As the adhesive layer, an adhesive layer formed by applying a moisture-curable polyurethane-based, polyisocyanate-polyester-based two-liquid type, polyisocyanate-polyether-based two-liquid type, polyisocyanate-polyacrylic-based two-liquid type, polyisocyanate-polyurethane elastomer-based two-liquid type, epoxy-based, epoxy-polyurethane-based two-liquid type, polyester-based, acrylic, polyvinyl alcohol-based, polyimide-based, olefin-based, vinyl acetate-based or polyurethane urea-based one-liquid type adhesive may be used.

The thickness of the adhesive layer may be suitably determined according to intended use. For example, a thickness of 1 to 100 µm suffices for ordinary use.

In the present invention, the adhesive layer preferably has such high heat resistance that it can withstand processing temperature at the time of bending and/or injection molding. Stated more specifically, the above heat resistance of the adhesive layer is preferably not lower than 100° C. When the heat resistance of the adhesive layer is not lower than 100° C., the shrinkage of the polarizing film layer by heat at the time of bending and injection molding can be suppressed with the result that the yield of the optical article can be improved.

The adhesive layer having the above heat resistance is formed by using a polyurethane urea-based one-liquid type adhesive composed of the above polyurethane urea resin (I). In this case, from the viewpoint of improving the adhesion and heat resistance of the obtained laminate, the adhesive layer formed from the above polyurethane urea resin (I) has a heat resistance of preferably not lower than 100° C., more preferably 100 to 190° C., much more preferably 120 to 190° C., particularly preferably 150 to 190° C. Therefore, when the above polyurethane urea resin (I) is used to form the adhesive layer, the polyurethane urea resin (I) having a heat resistance of not lower than 100° C. is preferably used by adjusting the constituent components.

To set the heat resistance of the adhesive layer to not lower than 100° C., the polyisocyanate compound having at least two isocyanate groups in the molecule (III) may be used in combination like the photochromic composition. In this case, the adhesive layer contains the above polyurethane urea resin (I) and the component (III) but not a photochromic compound. The adhesive layer formed from a composition comprising the polyurethane urea resin (I) having a heat resistance of not lower than 80° C. to lower than 120° C. and the component (III) has improved adhesion to the polarizing film layer. When the heat resistance of the adhesive layer composed of the above composition is not lower than 100° C., the effect of improving heat resistance and adhesion is obtained. The preferred amount of the component (III) is as described above. The preferred component (III) is also as described above. For example, the component (III) is preferably at least one polyisocyanate compound selected from the component (IIIA) and the component (IIIB). To further enhance adhesion, the component (III) is preferably a combination of the above component (IIIA) and the above component (IIIB), the particularly preferred amounts thereof are as described above, and the preferred compounds are also as described above.

A description is subsequently given of the laminate of the present invention and the production method thereof.

<Laminate and Production Method Thereof>

The laminate of the present invention is a laminate having a laminate structure formed by bonding together a pair of opposed polycarbonate optical sheets or films through a polarizing film layer and an adhesive layer composed of a photochromic composition. This laminate is preferably one of laminates given below.

(a) The adhesive layer composed of the photochromic composition is formed on the polarizing film simplex, and a polycarbonate optical sheet or film is adhering to the adhesive layer composed of the photochromic composition. After the adhesive layer is formed on the polarizing film side of the obtained laminate sheet, another polycarbonate optical sheet or film is adhering to obtain the laminate of the present invention. The above adhesive layer may be formed between the adhesive layer composed of the photochromic composition and the polycarbonate optical sheet or film.

(b) A polarizing sheet is prepared by adhering a polycarbonate optical sheet or film to both sides of the polarizing film layer through the adhesive layer. The adhesive layer composed of the photochromic composition is formed on one side of this polarizing sheet and a polycarbonate optical sheet or film is adhering to the adhesive layer composed of the photochromic composition to obtain the laminate of the present invention. The above adhesive layer may be formed between the adhesive layer composed of the photochromic composition and the polycarbonate optical sheet or film.

(c) A polarizing sheet is prepared by adhering a cellulose triacetate film to both sides of the polarizing film layer. The adhesive layer composed of the photochromic composition is formed on one side of this polarizing sheet and further a polycarbonate optical sheet or film is adhering to the adhesive layer composed of the photochromic composition. Further, after the adhesive layer is formed on the cellulose triacetate film on the other side of the obtained laminate sheet, another polycarbonate optical sheet or film is adhering to obtain the laminate of the present invention. The above adhesive layer may be formed between the adhesive layer composed of the photochromic composition and the polycarbonate optical sheet or film and further between the adhesive layer composed of the photochromic composition and the cellulose triacetate film.

In the laminate of the present invention, by forming the above adhesive layer between layers, the adhesion of the laminate can be improved and the laminate of the present invention whose layers are integrated by the adhesive layers can be obtained.

The thickness of the laminate of the present invention is preferably 300 to 2,000 µm from the viewpoint of workability in consideration of optical distortion and shape at the time of bending into a spherical shape.

(Preferred Laminate Structure of Laminate)

When the laminate is post-processed before use, for example, when it is bent and when a lens substrate is laminated by injection molding after bending, the laminate preferably has a laminate structure which is vertically symmetrical with the polarizing film layer as the center. To obtain a laminate having more excellent performance, a laminate having the following laminate structure is preferred.

Stated more specifically, it is a laminate having a laminate structure shown in FIG. 5. Describing in detail, the laminate consists of a polycarbonate optical sheet or film 1, an adhesive layer 8, an adhesive layer 2 composed of a photochromic composition, a polarizing film layer 3, an adhesive layer 9, an adhesive layer 8 and a polycarbonate optical sheet or film 1'. The adhesive layers 8 and 9 do not contain a photochromic compound. Not shown, the above third optical sheet or film may be formed on both sides of the polarizing film layer 3.

The above adhesive layer 9 may be omitted and only the above adhesive layer 8 suffices. In consideration of adhesion to the polarizing film layer 3 and the adhesion of the finally obtained laminate, the adhesive layer 9 which differs from the adhesive layer 8 is preferably formed.

Stated more specifically, the adhesive layer 8 is preferably composed of the polyurethane urea resin (I) having a heat resistance of preferably not lower than 100° C., more preferably 100 to 190° C., much more preferably 120 to 190° C., particularly preferably 150 to 190° C. The polyurethane urea resin (I) having this heat resistance can be synthesized by adjusting the amount of each constituent component and the composition.

Since the adhesive layer 9 is in contact with the polarizing film layer 3, it is preferably formed from a composition comprising the above polyurethane urea resin (I) having a heat resistance of 80 to 120° C. and the above component (III). The heat resistance of the adhesive layer 9 formed from this composition is preferably not lower than 100° C., more preferably 100 to 190° C., much more preferably 120 to 190° C., particularly preferably 150 to 190° C.

The adhesive layer 2 composed of the photochromic composition is preferably formed from a composition comprising the polyurethane urea resin (I) having a heat resistance of 80 to 120° C., the photochromic compound (II) and the above component (III). The heat resistance of the adhesive layer 2 formed from the photochromic composition is preferably not lower than 100° C., more preferably 100 to 190° C., much more preferably 120 to 190° C., particularly preferably 150 to 190° C.

That is, the adhesive layer 8 is preferably formed from a composition comprising the polyurethane urea resin (I) having relatively high hardness and high heat resistance. Preferably, the adhesive layer 2 and the adhesive layer 9 are formed from a composition comprising the relatively soft polyurethane urea resin (I) and the component (III) and changed into layers having high heat resistance when they are laminated. Since the adhesive layer 2 and the adhesive layer 9 have the above constitutions, the adhesion and bonding property to the polarizing film layer 3 of these layers can be further improved. In this case, the polyurethane urea resin (I) and the component (III) constituting the adhesive layer 2 and the adhesive layer 9 may be the same or different if they have the same level of heat resistance. However, when the productivity of the laminate is taken into consideration, they are preferably of the same type and used in the same amount (the amount calculated without considering the photochromic compound (II)).

Even when the laminate has a laminate structure shown in FIG. 5, it preferably has a vertically symmetrical structure with the polarizing film layer 3 as the center. Therefore, preferably, the two adhesive layers 8 above and below the polycarbonate optical sheet or film 1 and the polycarbonate optical sheet or film 1' are of the same type and have the same thickness. Although the adhesive layer 2 composed of the photochromic composition and the adhesive layer 9 differ from each other only in the existence of the photochromic compound, they preferably have the same composition and the same thickness.

<Optical Article Comprising the Laminate>

An optical article having a polycarbonate layer on the rear side can be obtained from the laminate of the present invention by injection molding the same polycarbonate as that of a polycarbonate optical sheet or film on the rear side on the polycarbonate optical sheet or film on the rear side to integrate them.

As means for integration, there is a method in which the above laminate is set in a mold and a polycarbonate for constituting an optical substrate is injection molded. At this point, the adhesive layer composed of the photochromic composition is situated on the mold side and the polarizing film layer is situated on the injection mold side. Before the laminate of the present invention is integrated with the optical substrate, it can be bent to be formed into a lens-like spherical shape. As means for bending the above laminate, thermal pressing, pressure processing or vacuum suction processing is employed. The temperature at the time of bending is suitably determined according to the type of the polycarbonate optical sheet or film used in the laminate but preferably 100 to 150° C.

EXAMPLES

The following examples are provided for the purpose of further illustrating the present invention but are in no way to be taken as limiting.

Example 1

(1) Production of Polyurethane Urea Resin (U1) (Production of Urethane Prepolymer)

A cooling tube, a thermometer and a nitrogen gas introduction tube were connected to a reaction vessel equipped with a max blend blade having a diameter of 135 mm and a baffle plate and having an inner diameter of 260 mm, a height of 280 mm and a loading capacity of 10 L. The max blend blade stirred at 100 rpm. 1,770 g of a polycarbonate diol having a number average molecular weight of 800, 700 g of isophorone diisocyanate and 500 g of toluene were fed to this reaction vessel to carry out a reaction in a nitrogen atmosphere at 100° C. for 7 hours so as to synthesize a urethane prepolymer having an isocyanate group at the end. The end point of the reaction was confirmed by the back titration method of an isocyanate group.

(Production of Polyurethane Urea Resin (U1))

After the end of the urethane prepolymer reaction, the reaction solution was cooled to around 0° C., dissolved in 1,430 g of isopropyl alcohol and 2,670 g of diethyl ketone and kept at a temperature of 0° C. Thereafter, a mixed solution of 171 g of bis-(4-aminocyclohexyl)methane and 145 g of diethyl ketone as chain extenders was added dropwise within 30 minutes to carry out a reaction at 0° C. for 1 hour. Then, 42 g of 1,2,2,6,6-pentamethyl-4-aminopiperidine was further added dropwise to carry out a reaction at 0° C. for 1 hour so as to obtain a diethyl ketone solution of a polyurethane urea resin (U1). The obtained polyurethane urea resin (U1) had a number average molecular weight of 19,000, a weight average molecular weight of 41,000, a polydispersity of 2.16, a softening point of 105° C. (softening start temperature; about 80° C.) and a kinetic viscosity of 15,000 cSt.

The reaction solution at the time of starting the addition of bis-(4-aminocyclohexyl)methane which is a polyamine compound had a viscosity of 0.06 kg/m·s and a density of 900 kg/m³, the revolution of the max blend blade was 100 rpm, the Reynolds number (Re) was 456, and the mixing time number (n·θ$_M$) was 14 according to the n·θ$_M$-Re curve of the max blend blade. Therefore, the complete mixing time (θ$_M$) was 8 seconds.

<Evaluation Method>

The number average molecular weight, weight average molecular weight, polydispersity, softening point and kinetic viscosity of the above polyurethane urea resin (U1) were measured by the following methods.

(Number Average Molecular Weight, Weight Average Molecular Weight, Polydispersity)

The number average molecular weight, the weight average molecular weight and the polydispersity were obtained by carrying out analysis in the methods described in this text.

That is, the number average molecular weight and the weight average molecular weight of the above polyurethane urea resin were obtained by measuring a 1.0% dimethyl formamide (DMF) solution of the polyurethane urea resin (U1) sample by using a gel permeation chromatograph (GPC) in terms of polyethylene oxide, two Shodex KD-806M columns connected in series (manufactured by Showa Denko K.K.), a LiBr (10 mmol/L)/DMF solution as an elute and a RI detector at a flow rate of 1 ml/min and calculating with the Empower Personal GPC Option GPC analyzing software of Nihon Waters K.K. The polydispersity is a weight average molecular weight/number average molecular weight ratio and a value calculated from number average molecular weight and weight average molecular weight obtained by the above method.

(Heat Resistance; Softening Point)

The polyurethane urea resin (U1) was poured into a stainless steel vessel and dried at 40° C. for 10 hours, at 60° C. for 10 hours and at 60° C. for 12 hours in a vacuum drier to prepare a test specimen having a thickness of 1 mm. The softening point of the obtained test specimen was measured by using a thermomechanical analyzer (TMA120C of Seiko Instruments Inc.) and a needle probe having an end diameter of 0.5 mm at a temperature elevation rate of 10° C./min and a measurement temperature range of 30 to 200° C.

(Kinetic Viscosity)

About 10 g of the polyurethane urea resin (U1) solution was charged into a Canon Fenske viscometer (#600) (made of Shibata Kagaku KK), which was then immersed in a thermobath kept at 25° C.±0.1° C. for 15 minutes to measure the kinetic viscosity.

(2) Preparation of Photochromic Composition 1

1,000 g of the polyurethane urea resin (U1) solution, 5.7 g of a photochromic compound (PC1/PC2/PC3=4.0/1.0/0.7 g), 43.2 g of an isomer mixture of 4,4'-methylenebis(cyclohexyl isocyanate), 3.6 g of ethylenebis(oxyethylene)bis[3-(5-tert-butyl-4-hydroxy-m-tolyl)propionate] as an antioxidant and 0.5 g of DOW CORNING TORAY L-7001 as a surfactant were added, stirred and mixed together at room temperature to obtain a photochromic composition 1.

PC1: compound represented by the following formula

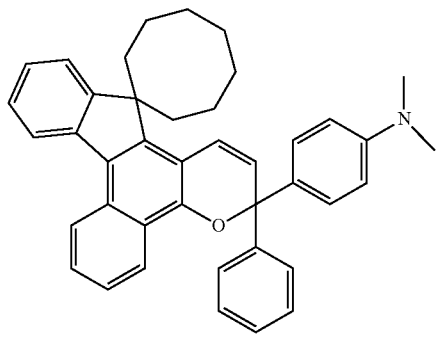 [SMILES: CN(C)c1ccc(C2(c3ccccc3)C=Cc3c4c(c5ccccc5c3O2)-c2ccccc2C42CCCCCCC2)cc1]

PC2: compound represented by the following formula

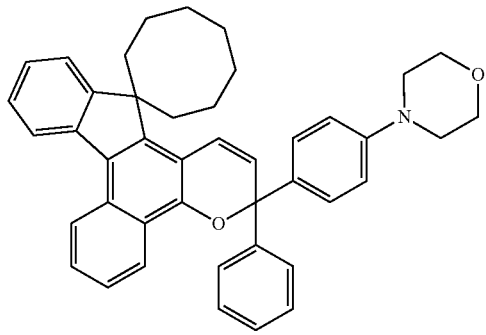 [SMILES: C1=CC(c2ccccc2)(c2ccc(N3CCOCC3)cc2)Oc2c1c1c(c3ccccc23)-c2ccccc2C12CCCCCCC2]

PC3: compound represented by the following formula

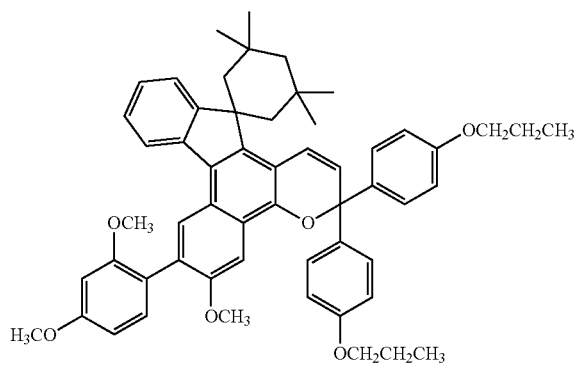

(3) Preparation of Polarizing Film

A polyvinyl alcohol film (trade name: VF-PS #7500; manufactured by Kuraray Co., Ltd.) raw fabric having a thickness of 75 μm was dyed in a mixed solution (dye solution) of 0.04% of iodine and 0.4% of potassium iodide kept at 30° C. to be dyed while it was stretched to a length which was 3 times the length of the raw fabric. This film was further immersed in a 3.5% boric acid aqueous solution (stretching bath) and stretched to a length which was 6 times the length of the raw fabric to manufacture a polarizing film 1 (thickness of 27 μm). The obtained polarizing film had a visual transmittance of 42.5% and a polarization degree of 99.2%.

(4) Production of Polyurethane Urea Resin (U2)
(Production of Urethane Prepolymer)

A cooling tube, a thermometer and a nitrogen gas introduction tube were connected to a reaction vessel equipped with a max blend blade having a diameter of 135 mm and a baffle plate and having an inner diameter of 260 mm, a height of 280 mm and a loading capacity of 10 L. The max blend blade stirred at 100 rpm.

800 g of a polycarbonate diol having a number average molecular weight of 1,000, 350 g of isophorone diisocyanate and 250 g of toluene were fed to this reaction vessel to carry out a reaction at 110° C. in a nitrogen atmosphere for 7 hours so as to synthesize a urethane prepolymer having an isocyanate group at the end. The end point of the reaction was confirmed by the back titration method of an isocyanate group.

(Production of Polyurethane Urea Resin (U2))

After the end of the urethane prepolymer reaction, the reaction solution was cooled to around 20° C., dissolved in 5,000 g of propylene glycol-monomethyl ether and kept at a temperature of 20° C. Thereafter, 121.5 g of isophorone diamine as a chain extender was added dropwise within 30 minutes to carry out a reaction at 20° C. for 1 hour. Then, 9 g of n-butylamine was added dropwise to carry out a reaction at 20° C. for 1 hour to obtain a propylene glycol-monomethyl ether solution of a polyurethane urea resin (U2). The obtained polyurethane urea resin (U2) had a number average molecular weight of 49,000, a weight average molecular weight of 89,000, a polydispersity of 1.82, a softening point of 175° C. (softening start temperature; about 155° C.) and a kinetic viscosity of 2,500 cSt.

The reaction solution at the time of starting the addition of isophorone diamine which is a polyamine compound had a viscosity of 0.04 kg/m·s and a density of 950 kg/m³, the revolution of the max blend blade was 100 rpm, the Reynolds number (Re) was 721, and the mixing time number $(n·θ_M)$ was 12 according to the $n·θ_M$–Re curve of the max blend blade. Therefore, the complete mixing time $(θ_M)$ was 7 seconds.

(5) Preparation of Adhesive 1 for Adhesive Layers

An adhesive 1 for adhesive layers was obtained by adding 0.7 g of DOW CORNING TORAY L-7001 as a surfactant to 1,000 g of a solution of the polyurethane urea resin (U2) and stirring and mixing them together at room temperature.

(6) Production of Laminate

The photochromic composition 1 obtained in (2) was applied to the polarizing film obtained in (3) by using a coater (manufactured by Tester Sangyo Co., Ltd.) and dried at 80° C. for 3 minutes to obtain a polarizing film having an adhesive layer composed of the photochromic composition 1 and having a thickness of 40 μm. Then, a polycarbonate sheet (monoaxially stretched sheet; phase difference of about 4,500 nm) having a thickness of 300 μm was adhering to the adhesive layer composed of the photochromic composition 1.

Further, the adhesive 1 (U2) for adhesive layers obtained in (5) was applied to the polarizing film side of the above laminate sheet by using a coater (manufactured by Tester Sangyo Co., Ltd.) and dried at 80° C. for 5 minutes to form an adhesive layer having a thickness of 3 μm, and then a polycarbonate optical sheet having a thickness of 300 μm was adhering to this adhesive layer.

This laminate was left at 40° C. for 1 week to obtain the laminate of the present invention having a total thickness of about 670 μm and polarization properties and photochromic properties.

The obtained laminate had a visual transmittance of 41.0%, a polarization degree of 99.1%, and a visual transmittance at the time of color development of 11.0%, a fading speed of 45 seconds and a durability of 93% as photochromic properties after ultraviolet irradiation. The peel strength was 150 N/25 mm at 25° C., 120 N/25 mm in a 70° C. atmosphere and 20 N/25 mm in a 150° C. atmosphere, and the adhesion stability time in a perspiration resistance test was about 400 hours (adhesion was retained for 408 hours).

These evaluations were made as follows.

[Visual Transmittance (Before Activated)]

The obtained laminate was used as a specimen and measured for visual transmittance before the ultraviolet irradiation of the laminate by using the UV-2550 ultraviolet-visible spectrophotometer of Shimadzu Corporation.

[Polarization Degree (Before Activated)]

Two obtained laminates were used as specimens and measured for parallel light transmittance (Tp) and orthogonal light transmittance (Tc) by using the UV-2550 ultraviolet-visible spectrophotometer of Shimadzu Corporation to obtain polarization degree (P) from the following equation.

Polarization degree $(P)$ (%)={$(Tp-Tc)/(Tp+Tc)$}×100

The above Tp and Tc are Y values obtained by measuring with the 2-degree field of view (C light source) of JIS Z 8701 and carrying out visibility correction.

[Photochromic Properties]

The obtained laminate was used as a specimen and irradiated with light from the L-2480 (300 W) SHL-100 xenon lamp of Hamamatsu Photonics K.K. through an aeromass filter (manufactured by Corning Co., Ltd.) at 23° C. and a beam strength at 365 nm of 2.4 mW/cm$^2$ and at 245 nm of 24 μW/cm$^2$ on the surface of the laminate for 120 seconds to develop color so as to measure the photochromic properties of the laminate.

Photochromic property; 1) visual transmittance on activated state: visual transmittance measured with the spectrophotometer (MCPD1000 instantaneous multi-channel photodetector) of Otsuka Electronics Co., Ltd. after 120 seconds of exposure to the above light Photochromic property; 2) fading speed [t½(sec)]: The maximum absorption wavelength after activated state was first obtained by the spectrophotometer (MCPD1000 instantaneous multi-channel photodetector) of Otsuka Electronics Co., Ltd. Then, the difference [ε (120)–ε (0)] between absorbance ε (120) after 120 seconds of irradiation at the above maximum absorption wavelength and absorbance ε (0) without irradiation at the maximum absorption wavelength was obtained and then time (fading speed) required until the absorbance at the above maximum wavelength of the specimen was reduced to ½ of [ε (120)–ε (0)] was obtained. It can be said that as this time becomes shorter, the photochromic properties become more excellent.

Photochromic property; 3) durability (%)=[(A96/A0)× 100]: The following accelerated deterioration test was carried out to evaluate color development durability by irradiation. That is, the obtained laminate was subjected to accelerated deterioration for 96 hours with the X25 xenon weather meter of Suga Test Instruments Co., Ltd. Thereafter, the above color optical density was evaluated before and after the test to measure color optical density (A0) before the test and color optical density (A96) after the test, and the value [(A96/A0)×100] was taken as a residual rate (%) which is an index for color development durability. As the residual rate becomes higher, durability becomes higher.

[Peel Strength]

The obtained laminate was formed into a test specimen having a bonded part measuring 25×100 mm which was set in a tester (AGS-500NX autograph of Shimadzu Corporation) equipped with a thermostat which can set a test ambient temperature to carry out a tensile test at a cross head speed of 100 mm/min so as to measure the following peel strengths 1) to 3).

Peel strength; 1) Peel strength at 25° C. was measured as described above after the specimen having the above size was left in a thermostat set to 25° C. for 10 minutes.

Peel strength: 2) Peel strength in a 70° C. atmosphere was measured as described above after the specimen having the above size was heated in a thermostat set to 70° C. for 10 minutes.

Peel strength; 3) Peel strength in a 150° C. atmosphere was measured as described above after the specimen having the above size was heated in a thermostat set to 150° C. for 10 minutes.

[Perspiration Resistance Test]

The obtained laminate was cut into a circular shape having a diameter of 50 mm, and the periphery of this test specimen was clamped with a stainless steel ring jig. Separately, artificial perspiration (distilled water containing 10% of common salt and 5% of lactic acid) contained in a plastic vessel with a lid was prepared, and the above test specimen was immersed in this artificial perspiration. The plastic vessel containing this test specimen and artificial perspiration was kept at 70° C. to visually check the existence of a peeled end of the test specimen every 24 hours. The numerical value of the evaluation result is a time during which the test specimen had stable adhesion (time right before peeling occurs).

Example 2

The laminate obtained in Example 1 was thermally bent into a spherical shape in such a manner that the adhesive layer composed of the photochromic composition 1 became the convex side and the polarizing film layer became the concave side. Thermal bending was carried out by preparing a concave mold having a suction port capable of vacuum suction with the mold as the center, placing the laminate having a diameter of 80 mm which had been diecut such that the adhesive layer composed of the photochromic composition 1 was situated on the mold side, and then vacuum sucking it at 130° C. for 5 minutes. Thereby, a spherical laminate having the adhesive layer composed of the photochromic composition 1 on the convex side and the polarizing film layer on the concave side was obtained.

Then, the obtained spherical laminate was set in the concave mold of an injection molding machine and heated at 100° C. A polycarbonate resin pellet (Panlite of Teijin Chemicals Ltd.) which had been preheated at 120° C. for 5 hours was filled into the injection molding machine and thermally molten at 300° C. and 60 rpm to be injected onto the rear side (polarizing film layer side) of the laminate at an injection pressure of 14,000 N/cm$^2$, thereby producing a plastic lens (optical article) integrated with the polycarbonate resin. The obtained plastic lens had a visual transmittance of 40.5%, a polarization degree of 99.1%, and a visual transmittance on activated state of 11.0%, a fading speed of 45 seconds and durability of 93% as photochromic properties after ultraviolet irradiation. The adhesion stability time in a perspiration resistance test was about 1,000 hours (adhesion was retained for 1,008 hours). The bending workability was A. The evaluation of bending workability was carried out as follows.

[Bending Workability]

After the above bending, a laminate which could be bent into a desired shape was visually evaluated as A, a laminate which was slightly distorted was visually evaluated as B, and a laminate which was so much distorted that it was hardly set in the mold of an injection molding machine was visually evaluated as C.

Example 3

The photochromic composition 1 obtained in (2) was applied to the polarizing film obtained in (3) by using a coater (manufactured by Tester Sangyo Co., Ltd.) and dried at 80° C. for 3 minutes to obtain a polarizing film having an adhesive layer composed of the photochromic composition 1 and having a thickness of 40 μm. Then, a polycarbonate sheet (monoaxially stretched sheet: phase difference of about 4,500 nm) having a thickness of 300 μm was adhering to this adhesive layer composed of the photochromic composition 1.

Further, an acrylic adhesive (Saibinol AT-245 of Saiden Chemical Industry Co., Ltd.) was applied to the polarizing film of the above laminate sheet by using a coater (manufactured by Tester Sangyo Co., Ltd.) and dried at 80° C. for 5 minutes to form an adhesive layer having a thickness of 10 μm, and then a polycarbonate optical sheet having a thickness of 300 μm was adhering to this adhesive layer.

This laminate was left at 40° C. for 1 week to obtain the laminate of the present invention having a total thickness of about 677 μm and polarization properties and photochromic properties.

The obtained laminate had a visual transmittance of 41.0%, a polarization degree of 99.1%, and a visual transmittance on activated state of 11.0%, a fading speed of 45 seconds and a durability of 93% as photochromic properties after ultraviolet irradiation. The peel strength was 120 N/25 mm at room temperature, 90 N/25 mm in a 70° C. atmosphere and 10 N/25 mm in a 150° C. atmosphere, and the adhesion stability time in a perspiration resistance test was about 200 hours (adhesion was retained for 216 hours).

Example 4

The laminate obtained in Example 3 was thermally bent and injection molded in the same manner as in Example 2 to produce a plastic lens (optical article) integrated with a polycarbonate resin. The obtained plastic lens had a visual transmittance of 40.6%, a polarization degree of 99.1%, and a visual transmittance on activated state of 11.0%, a fading speed of 45 seconds and a durability of 93% as photochromic properties after ultraviolet irradiation. The adhesion stability time in a perspiration resistance test was about 500 hours (adhesion was retained for 504 hours). The bending workability was B.

Example 5

The photochromic composition 1 obtained in (2) was applied to the polarizing film obtained in (3) by using a coater (manufactured by Tester Sangyo Co., Ltd.) and dried at 80° C. for 3 minutes to obtain a polarizing film having an adhesive layer composed of the photochromic composition 1 and having a thickness of 40 μm. Then, a polycarbonate sheet (monoaxially stretched sheet: phase difference of about 4,500 nm) having a thickness of 300 μm was adhering to this adhesive layer composed of the photochromic composition 1.

Further, an olefin-based adhesive (Ricon 142 of Tomoe Engineering Co., Ltd.) was applied to the polarizing film of the above laminate sheet by using a coater (manufactured by Tester Sangyo Co., Ltd.) and dried at 80° C. for 5 minutes to form an adhesive layer having a thickness of 10 μm, and then a polycarbonate optical sheet having a thickness of 300 μm was attached to this adhesive layer.

This laminate was left at 40° C. for 1 week to obtain the laminate of the present invention having a total thickness of about 677 μm and polarization properties and photochromic properties.

The obtained laminate had a visual transmittance of 41.0%, a polarization degree of 99.1%, and a visual transmittance on activated state of 11.0%, a fading speed of 45 seconds and a durability of 93% as photochromic properties after ultraviolet irradiation. The peel strength was 120 N/25 mm at room temperature, 80 N/25 mm in a 70° C. atmosphere and 10 N/25 mm in a 150° C. atmosphere, and the adhesion stability time in a perspiration resistance test was about 200 hours (adhesion was retained for 216 hours).

Example 6

The laminate obtained in Example 5 was thermally bent and injection molded in the same manner as in Example 2 to produce a plastic lens (optical article) integrated with a polycarbonate resin. The obtained plastic lens had a visual transmittance of 40.6%, a polarization degree of 99.1%, and a visual transmittance on activated state of 11.0%, a fading speed of 45 seconds and a durability of 93% as photochromic properties after ultraviolet irradiation. The adhesion stability time in a perspiration test was about 400 hours (adhesion was retained for 408 hours). The bending workability was B.

Example 7

The photochromic composition 1 obtained in (2) was applied to the polarizing film obtained in (3) by using a coater (manufactured by Tester Sangyo Co., Ltd.) and dried at 80° C. for 3 minutes to obtain a polarizing film having an adhesive layer composed of the photochromic composition 1 and having a thickness of 40 μm. Then, a polycarbonate sheet (monoaxially stretched sheet: phase difference of about 4,500 nm) having a thickness of 300 μm was adhering to this adhesive layer composed of the photochromic composition 1.

Further, a coating solution prepared by mixing together a moisture-curable urethane adhesive (Takenate of Mitsui Takeda Chemicals, Inc.) and a triisocyanate-based curing agent was applied to the polarizing film of the above laminate sheet by using a coater (manufactured by Tester Sangyo Co., Ltd.) and dried at 80° C. for 5 minutes to form an adhesive layer having a thickness of 10 μm, and then, a polycarbonate optical sheet having a thickness of 300 μm was adhering to this adhesive layer.

This laminate was left at 40° C. for 1 week to obtain the laminate of the present invention having a total thickness of about 677 μm and polarization properties and photochromic properties.

The obtained laminate had a visual transmittance of 41.0%, a polarization degree of 99.1%, and a visual transmittance on activated state of 11.0%, a fading speed of 45 seconds and a durability of 93% as photochromic properties after ultraviolet irradiation. The peel strength was 160 N/25 mm at room temperature, 120 N/25 mm in a 70° C. atmosphere and 20 N/25 mm in a 150° C. atmosphere, and the adhesion stability time in a perspiration resistance test was about 450 hours (adhesion was retained for 456 hours).

Example 8

The laminate obtained in Example 7 was thermally bent and injection molded in the same manner as in Example 2 to produce a plastic lens (optical article) integrated with a polycarbonate resin. The obtained plastic lens had a visual transmittance of 40.6%, a polarization degree of 99.1%, and a visual transmittance on activated state of 11.0%, a fading speed of 45 seconds and a durability of 93% as photochromic properties after ultraviolet irradiation. The adhesion stability time in a perspiration resistance test was about 1,000 hours (adhesion was retained for 1,008 hours). The bending workability was B.

Example 9

The photochromic composition 1 obtained in (2) was applied to the polarizing film obtained in (3) by using a coater (manufactured by Tester Sangyo Co., Ltd.) and dried at 80° C. for 3 minutes to obtain a polarizing film having an adhesive layer composed of the photochromic composition 1 and having a thickness of 40 μm. Then, a polycarbonate sheet (monoaxially stretched sheet: phase difference of about 4,500 nm) having a thickness of 300 μm was attached to this adhesive layer composed of the photochromic composition 1.

Further, a polyvinyl alcohol-based adhesive (Gohsenol of The Nippon Synthetic Chemical Industry Co., Ltd.) was applied to the polarizing film of the above laminate sheet by using a coater (manufactured by Tester Sangyo Co., Ltd.) and dried at 80° C. for 5 minutes to form an adhesive layer having a thickness of 10 μm, and then a polycarbonate optical sheet having a thickness of 300 μm was attached to this adhesive layer.

This laminate was left at 40° C. for 1 week to obtain the laminate of the present invention having a total thickness of about 677 μm and polarization properties and photochromic properties.

The obtained laminate had a visual transmittance of 41.0%, a polarization degree of 99.1%, and a visual transmittance on activated state of 11.0%, a fading speed of 45 seconds and a durability of 93% as photochromic properties after ultraviolet irradiation. The peel strength was 130 N/25 mm at room temperature, 100 N/25 mm in a 70° C. atmosphere and 15 N/25 mm in a 150° C. atmosphere, and the adhesion stability time in a perspiration resistance test was about 350 hours (adhesion was retained for 360 hours).

Example 10

The laminate obtained in Example 7 was thermally bent and injection molded in the same manner as in Example 2 to produce a plastic lens (optical article) integrated with a polycarbonate resin. The obtained plastic lens had a visual transmittance of 40.6%, a polarization degree of 99.1%, and a visual transmittance on activated state of 11.0%, a fading speed of 45 seconds and a durability of 93% as photochromic properties after ultraviolet irradiation. The adhesion stability time in a perspiration resistance test was about 800 hours (adhesion was retained for 816 hours). The bending workability was B.

Example 11

The adhesive 1 for adhesive layers obtained in (5) was applied to the polarizing film obtained in (3) by using a coater (manufactured by Tester Sangyo Co., Ltd.) and dried at 80° C. for 3 minutes to obtain a polarizing film having an adhesive layer with a thickness of 3 μm. A polycarbonate sheet (monoaxially stretched sheet: phase difference of about 4,500 nm) having a thickness of 150 μm was attached to this adhesive layer.

Further, the adhesive 1 for adhesive layers obtained in (5) was applied to the other side of the polarizing film by using a coater (manufactured by Tester Sangyo Co., Ltd.) and dried at 80° C. for 5 minutes to form an adhesive layer having a thickness of 3 μm, and a polycarbonate sheet having a thickness of 300 μm was attached to this adhesive layer to obtain a polarizing sheet sandwiched between two polycarbonate sheets.

The photochromic composition 1 obtained in (2) was applied to the polycarbonate sheet (monoaxially stretched sheet; phase difference of about 4,500 nm) having a thickness of 150 μm of the polarizing sheet by using a coater (manufactured by Tester Sangyo Co., Ltd.) and dried at 80° C. for 3 minutes to obtain a polarizing sheet having an adhesive layer composed of the photochromic composition 1 and having a thickness of 40 μm. Then, a polycarbonate sheet (monoaxially stretched sheet: phase difference of about 4,500 nm) having a thickness of 150 μm was attached to this adhesive layer composed of the photochromic composition 1.

This laminate was left at 40° C. for 1 week to obtain a laminate having a total thickness of about 673 μm and polarization properties and photochromic properties.

The obtained laminate had a visual transmittance of 41.3%, a polarization degree of 99.2%, and a visual transmittance on activated state of 11.0%, a fading speed of 45 seconds and a durability of 93% as photochromic properties after ultraviolet irradiation. The peel strength was 140 N/25 mm at room temperature, 110 N/25 mm in a 70° C. atmosphere and 20 N/25 mm in a 150° C. atmosphere, and the adhesion stability time in a perspiration resistance test was about 400 hours (adhesion was retained for 408 hours).

Example 12

The laminate obtained in Example 11 was thermally bent and injection molded in the same manner as in Example 2 to produce a plastic lens (optical article) integrated with a polycarbonate resin. The obtained plastic lens had a visual transmittance of 40.6%, a polarization degree of 99.1%, and a visual transmittance on activated state of 11.0%, a fading speed of 45 seconds and a durability of 93% as photochromic properties after ultraviolet irradiation. The adhesion stability time in a perspiration resistance test was about 1,000 hours (adhesion was retained for 1,008 hours). The bending workability was A.

Example 13

A laminate having the same constitution as that of Example 3 was obtained except that an adhesive layer was formed by applying the adhesive 1 for adhesive layers obtained in (5) to both sides of the adhesive layer composed of the photochromic composition 1 in the laminate obtained in Example 11. The total thickness of this laminate was about 680 μm.

The obtained laminate had a visual transmittance of 41.5%, a polarization degree of 99.0%, and a visual transmittance on activated state of 11.0%, a fading speed of 45 seconds and a durability of 93% as photochromic properties after ultraviolet irradiation. The peel strength was 180 N/25 mm at room temperature, 125 N/25 mm in a 70° C. atmosphere and 30 N/25 mm in a 150° C. atmosphere, and the adhesion stability time in a perspiration resistance test was about 800 hours (adhesion was retained for 816 hours).

Example 14

The laminate obtained in Example 13 was thermally bent and injection molded in the same manner as in Example 2 to produce a plastic lens (optical article) integrated with a polycarbonate resin. The obtained plastic lens had a visual transmittance of 40.8%, a polarization degree of 99.0%, and a visual transmittance on activated state of 11.0%, a fading speed of 45 seconds and a durability of 93% as photochromic properties after ultraviolet irradiation. The adhesion stability time in a perspiration resistance test was about 1,400 hours (adhesion was retained for 1, 416 hours). The bending workability was A.

Example 15

A laminate having the same constitution as that of Example 13 was obtained except that an adhesive layer was formed by applying a coating solution prepared by mixing together a moisture-curable urethane adhesive (Takenate of Mitsui Takeda Chemicals, Inc.) and a triisocyanate-based curing agent to both sides of the adhesive layer composed of the photochromic composition 1 in the laminate obtained in Example 11. The total thickness of this laminate was about 680 μm.

The obtained laminate had a visual transmittance of 41.5%, a polarization degree of 99.0%, and a visual transmittance on activated state of 11.0%, a fading speed of 45 seconds and a durability of 93% as photochromic properties after ultraviolet irradiation. The peel strength was 170 N/25 mm at room temperature, 125 N/25 mm in a 70° C. atmosphere and 30 N/25 mm in a 150° C. atmosphere, and the adhesion stability time in a perspiration resistance test was about 700 hours (adhesion was retained for 720 hours).

Example 16

The laminate obtained in Example 15 was thermally bent and injection molded in the same manner as in Example 2 to produce a plastic lens (optical article) integrated with a polycarbonate resin. The obtained plastic lens had a visual transmittance of 40.8%, a polarization degree of 99.0%, and a visual transmittance on activated state of 11.0%, a fading speed of 45 seconds and a durability of 93% as photochromic properties after ultraviolet irradiation. The adhesion stability time in a perspiration resistance test was about 1,300 hours (adhesion was retained for 1,320 hours). The bending workability was B.

Example 17

A laminate having the same constitution as that of Example 13 was obtained except that an adhesive layer was formed by applying a polyvinyl alcohol-based adhesive (Gohsenol of The Nippon Synthetic Chemical Industry, Co., Ltd.) to one side of the adhesive layer composed of the photochromic composition 1 and applying an acrylic adhesive (Saibinol AT-245 of Saiden Chemical Industry Co., Ltd.) to the other side of the adhesive layer composed of the photochromic composition 1 in the laminate obtained in Example 11. The total thickness of this laminate was about 680

The obtained laminate had a visual transmittance of 41.5%, a polarization degree of 99.0%, and a visual transmittance on activated state of 11.0%, a fading speed of 45 seconds and a durability of 93% as photochromic properties after ultraviolet irradiation. The peel strength was 130 N/25 mm at room temperature, 110 N/25 mm in a 70° C. atmosphere and 20 N/25 mm in a 150° C. atmosphere, and the adhesion stability time in a perspiration resistance test was about 500 hours (adhesion was retained for 504 hours).

Example 18

The laminate obtained in Example 17 was thermally bent and injection molded in the same manner as in Example 2 to produce a plastic lens (optical article) integrated with a polycarbonate resin. The obtained plastic lens had a visual transmittance of 40.8%, a polarization degree of 99.0%, and a visual transmittance on activated state of 11.0%, a fading speed of 45 seconds and a durability of 93% as photochromic properties after ultraviolet irradiation. The adhesion stability time in a perspiration resistance test was about 1,100 hours (adhesion was retained for 1,104 hours). The bending workability was B.

Example 19

A polarizing sheet (Sumikaran SQ-1852A of Sumitomo Chemical Co., Ltd.) having a thickness of 180 μm and a visual transmittance of 43.7% was used as a polarizing film. This polarizing film was prepared by bonding a cellulose triacetate film having a thickness of 80 μm to both sides of a polarizing film having a thickness of 20 μm and composed of polyvinyl alcohol having a polarization degree of 99.9% by using a iodine-based dye.

The adhesive 1 for adhesive layers obtained in (5) was applied to the polarizing sheet described in (3) by using a coater (Tester Sangyo Co., Ltd.) and dried at 80° C. for 5 minutes to obtain a polarizing sheet having an adhesive layer with a thickness of 3 μm. A polycarbonate sheet having a thickness of 300 μm was attached to this adhesive layer.

Further, the photochromic composition 1 obtained in (2) was applied to the surface of the cellulose triacetate film on the other side of the polarizing sheet by using a coater (manufactured by Tester Sangyo Co., Ltd.) and dried at 80° C. for 3 minutes to form an adhesive layer composed of the photochromic composition 1 and having a thickness of 40 μm, and then a polycarbonate sheet having a thickness of 150 μm (monoaxially stretched sheet; phase difference of about 4,500 nm) was attached to this adhesive layer.

This laminate was left at 40° C. for 1 week to obtain a laminate having a total thickness of about 673 μm and polarization properties and photochromic properties.

The obtained laminate had a visual transmittance of 43.3%, a polarization degree of 99.9%, and a visual transmittance on activated state of 11.0%, a fading speed of 45 seconds and a durability of 93% as photochromic properties after ultraviolet irradiation. The peel strength was 140 N/25 mm at room temperature, 110 N/25 mm in a 70° C. atmosphere and 20 N/25 mm in a 150° C. atmosphere, and the adhesion stability time in a perspiration resistance test was about 400 hours (adhesion was retained for 408 hours).

Example 20

The laminate obtained in Example 19 was thermally bent and injection molded in the same manner as in Example 2 to produce a plastic lens (optical article) integrated with a polycarbonate resin. The obtained plastic lens had a visual transmittance of 43.2%, a polarization degree of 99.9%, and a visual transmittance on activated state of 11.0%, a fading speed of 45 seconds and a durability of 93% as photochromic properties after ultraviolet irradiation. The adhesion stability time in a perspiration resistance test was about 900 hours (adhesion was retained for 912 hours). The bending workability was A.

Example 21

A laminate having the same constitution as that of Example 19 was obtained except that an adhesive layer was formed by applying the adhesive 1 for adhesive layers obtained in (5) to both sides of the adhesive layer composed of the photochromic composition 1 in the laminate obtained in Example 19. The total thickness of this laminate was about 686 μm.

The obtained laminate had a visual transmittance of 43.3%, a polarization degree of 99.9%, and a visual transmittance on activated state of 11.0%, a fading speed of 45 seconds and a durability of 93% as photochromic properties after ultraviolet irradiation. The peel strength was 180 N/25 mm at room temperature, 125 N/25 mm in a 70° C. atmosphere and 30 N/25 mm in a 150° C. atmosphere, and the adhesion stability time in a perspiration resistance test was about 800 hours (adhesion was retained for 816 hours).

Example 22

The laminate obtained in Example 21 was thermally bent and injection molded in the same manner as in Example 2 to produce a plastic lens (optical article) integrated with a polycarbonate resin. The obtained plastic lens had a visual transmittance of 43.2%, a polarization degree of 99.9%, and a visual transmittance on activated state of 11.0%, a fading speed of 45 seconds and a durability of 93% as photochromic properties after ultraviolet irradiation. The adhesion stability time in a perspiration resistance test was about 1,400 hours (adhesion was retained for 1, 416 hours). The bending workability was A.

Example 23

Production of Polyurethane Urea Resin (U3)

A polyurethane urea resin for the adhesive layer composed of a photochromic composition was produced in the same manner as in (1) above except that the revolution of the max blend blade at the start of adding dropwise bis-(4-aminocyclohexyl) methane which is a polyamine compound was changed to 40 rpm. The obtained polyurethane urea resin (U3) had a number average molecular weight of 21,000, a weight average molecular weight of 54,000, a polydispersity of 2.57, a softening point of 100° C. (softening start temperature; about 50° C.) and a kinetic viscosity of 5,5000 cSt.

Since the Reynolds number (Re) became 192 by changing the revolution of the max blend blade at the start of adding dropwise bis-(4-aminocyclohexyl)methane which is a polyamine compound to 40 rpm and the mixing time number $(n \cdot \theta_M)$ was 25 according to the $n \cdot \theta_M$-Re curve of the max blend blade, the complete mixing time $(\theta_M)$ was 38 seconds.

Then, a photochromic composition 2 was obtained in the same manner as in (2) except that a solution of the polyurethane urea resin (U3) was used.

Further, a laminate was obtained in the same manner as in Example 1 except that the photochromic composition 2 was used in place of the photochromic composition 1. This laminate had a total thickness of about 670 μm and polarization properties and photochromic properties.

The obtained laminate had a visual transmittance of 41.0%, a polarization degree of 99.1%, and a visual transmittance on activated state of 11.0%, a fading speed of 45 seconds and a durability of 91% as photochromic properties after ultraviolet irradiation. The peel strength was 140 N/25 mm at room temperature, 80 N/25 mm in a 70° C. atmosphere and 20 N/25 mm in a 150° C. atmosphere, and the adhesion stability time in a perspiration resistance test was about 100 hours (adhesion was retained for 96 hours).

Example 24

The laminate obtained in Example 23 was thermally bent and injection molded in the same manner as in Example 2 to produce a plastic lens (optical article) integrated with a polycarbonate resin. The obtained plastic lens had a visual transmittance of 40.5%, a polarization degree of 99.1%, and a visual transmittance on activated state of 11.0%, a fading speed of 45 seconds and a durability of 91% as photochromic properties after ultraviolet irradiation. The adhesion stability time in a perspiration resistance test was about 300 hours (adhesion was retained for 312 hours). The bending workability was B.

Example 25 (Laminate Shown in FIG. 5)

The adhesive 1 for adhesive layers obtained in (5) was applied to a polycarbonate sheet having a thickness of 300 μm (monoaxially stretched sheet; phase difference of about 4,500 nm) by using a coater (Tester Sangyo Co., Ltd.) and dried at 80° C. for 5 minutes to form an adhesive layer having a thickness of 5 μm (adhesive layer 8 shown in FIG. 5). Then, the photochromic composition 1 obtained in (2) was applied to a PET (polyethylene terephthalate) film (Purex film having a silicon coating film, manufactured by Teijin DuPont Films Japan Limited) and dried at 110° C. for 10 minutes to form a photochromic layer having a thickness of 40 μm which was then attached to the above adhesive layer (adhesive layer 8 shown in FIG. 5).

Separately, the adhesive 1 for adhesive layers obtained in (5) was applied to a polycarbonate sheet having a thickness of 300 μm by using a coater (manufactured by Tester Sangyo Co., Ltd.) and dried at 80° C. for 5 minutes to form an adhesive layer having a thickness of 5 μm (adhesive layer 8 shown in FIG. 5). Then, an adhesive 2 for adhesive layers obtained in (7) below was applied to a PET (polyethylene terephthalate) film (Purex film having a silicon coating film, manufactured by Teijin DuPont Films Japan Limited) and dried at 110° C. for 10 minutes to form a layer composed of the adhesive 2 for adhesive layers and having a thickness of 40 μm which was then attached to the adhesive layer (adhesive layer 8 shown in FIG. 5) formed on the above polycarbonate sheet.

The polarizing film 1 of (3) was sandwiched between the above two different sheets while the PET films were peeled off from the above sheets. The obtained laminate was left at 40° C. under vacuum for 24 hours, heated at 90° C. for 60 minutes, humidified at 60° C. and 100 RH for 24 hours and finally left to stand at 40° C. under vacuum for 24 hours to obtain a laminate having a laminate structure shown in FIG. 5, polarization properties and photochromic properties and a total thickness of 710 μm. The layer configuration of this laminate had heat-resistant symmetry.

(7) Preparation of Adhesive 2 for Adhesive Layers 1,000 g of a solution of the polyurethane urea resin (U1), 43.2 g of an isomer mixture of 4,4'-methylenebis(cyclohexyl isocyanate) and 0.5 g of DOW CORNING TORAY L-7001 as a surfactant were added, stirred and mixed together at room temperature to obtain an adhesive 2 for adhesive layers. This adhesive 2 for adhesive layers had the same composition as that of the above photochromic composition 1 except that this did not contain a photochromic compound.

The evaluation of the obtained laminate was carried out in the same manner as in Example 1

Example 26

The laminate obtained in Example 25 was used to manufacture a plastic lens (optical article) and evaluate it in the same manner as in Example 2. The evaluation results are shown in Table 5.

Example 27

The same operation as that of Example 1 was made on the laminate obtained in Example 1 except that a photochromic composition 3 below was used in place of the photochromic composition 1 to obtain a laminate having the same constitution as that of Example 1 and evaluate it in the same manner as in Example 1. The total thickness of this laminate was about 670 μm.

(8) Preparation of Photochromic Composition 3

1,000 g of a solution of the photochromic urea resin (U1), 5.7 g of a photochromic compound (PC1/PC2/PC3=4.0/1.0/0.7 g), 3.6 g of ethylenebis(oxyethylene)bis[3-(5-tert-butyl-4-hydroxy-m-tolyl)propionate] as an antioxidant and 0.5 g of DOW CORNING TORAY L-7001 as a surfactant were added, stirred and mixed together at room temperature to obtain a photochromic composition 3.

Example 28

The laminate obtained in Example 27 was used to manufacture a plastic lens (optical article) and evaluate it in the same manner as in Example 2.

Example 29

The same operation as that of Example 25 was made on the laminate obtained in Example 25 except that the photochromic composition 3 was used in place of the photochromic composition 1 to obtain a laminate having the same constitution as that of Example 25 and evaluate it in the same manner as in Example 25. The total thickness of this laminate was about 710 μm.

Example 30

The laminate obtained in Example 29 was used to manufacture a plastic lens (optical article) and evaluate it in the same manner as in Example 2.

Example 31

The same operation as that of Example 25 was made on the laminate obtained in Example 25 except that the thickness of the adhesive layer obtained from the adhesive 2 for adhesive layers was changed to 5 μm to obtain a laminate having the same constitution as that of Example 25 and evaluate it in the same manner as in Example 25. The total thickness of this laminate was about 675 μm.

Example 32

The laminate obtained in Example 31 was used to manufacture a plastic lens (optical article) and evaluate in the same manner as in Example 2.

Example 33

A laminate was produced in the same manner as in Example 25 except that a photochromic composition 5 shown in Table 2 was used in place of the photochromic composition 1 and an adhesive 3 for adhesive layers shown in Table 3 was used in place of the adhesive 2 for adhesive layers. The evaluation results are shown in Table 5.

The photochromic composition 5 was prepared in the same manner as in (2) except that an isomer mixture of 4,4'-methylenebis(cyclohexyl isocyanate) (IIIA) and a burette compound of hexamethylene diisocyanate (IIIB) were used as the component (III) in a ratio shown in Table 2.

The adhesive 3 for adhesive layers was prepared in the same manner as in (7) except that an isomer mixture of 4,4'-methylenebis(cyclohexyl isocyanate) (IIIA) and a burette compound of hexamethylene diisocyanate (IIIB) were used as the component (III) in a ratio shown in Table 3. This adhesive 3 for adhesive layers had the same composition as that of the above photochromic composition 5 except that it did not contain a photochromic compound.

Example 34

The laminate obtained in Example 33 was used to manufacture a plastic lens (optical article) and evaluate it in the same manner as in Example 2. The evaluation results are shown in Table 6.

Example 35

A laminate was produced in the same manner as in Example 25 except that a photochromic composition 6 shown in Table 2 was used in place of the photochromic composition 1 and an adhesive 4 for adhesive layers shown in Table 3 was used in place of the adhesive 2 for adhesive layers. The evaluation results are shown in Table 5.

The photochromic composition 6 was prepared in the same manner as in (2) except that an isomer mixture of 4,4'-methylenebis(cyclohexyl isocyanate) (IIIA) and a burette compound of hexamethylene diisocyanate (IIIB) were used as the component (III) in a ratio shown in Table 2.

The adhesive 4 for adhesive layers was prepared in the same manner as in (7) except that an isomer mixture of 4,4'-methylenebis(cyclohexyl isocyanate) (IIIA) and a burette compound of hexamethylene diisocyanate (IIIB) were used as the component (III) in a ratio shown in Table 3. This adhesive 4 for adhesive layers had the same composition as the above photochromic composition 6 except that it did not contain a photochromic compound.

Example 36

The laminate obtained in Example 35 was used to manufacture a plastic lens (optical article) and evaluate it in the same manner as in Example 2. The evaluation results are shown in Table 6.

Example 37

A laminate was produced in the same manner as in Example 25 except that a photochromic composition 7 shown in Table 2 was used in place of the photochromic composition 1 and an adhesive 5 for adhesive layers shown in Table 3 was used in place of the adhesive 2 for adhesive layers. The evaluation results are shown in Table 5.

The photochromic composition 7 was prepared in the same manner as in (2) except that an isomer mixture of 4,4'-methylenebis(cyclohexyl isocyanate) (IIIA) and a burette compound of hexamethylene diisocyanate (IIIB) were used as the component (III) in a ratio shown in Table 2.

The adhesive 5 for adhesive layers was prepared in the same manner as in (7) except that an isomer mixture of 4,4'-methylenebis(cyclohexyl isocyanate) (IIIA) and a burette compound of hexamethylene diisocyanate (IIIB) were used as the component (III) in a ratio shown in Table 3. This adhesive 5 for adhesive layers had the same composition as the above photochromic composition 7 except that it did not contain a photochromic compound.

Example 38

The laminate obtained in Example 37 was used to manufacture a plastic lens (optical article) and evaluate it in the same manner as in Example 2. The evaluation results are shown in Table 6.

Example 39

A laminate was produced in the same manner as in Example 25 except that a photochromic composition 8 shown in Table 2 was used in place of the photochromic composition 1 and an adhesive 6 for adhesive layers shown in Table 3 was used in place of the adhesive 2 for adhesive layers. The evaluation results are shown in Table 5.

The photochromic composition 8 was prepared in the same manner as in (2) except that an isomer mixture of 4,4'-methylenebis(cyclohexyl isocyanate) (IIIA) and a burette compound of hexamethylene diisocyanate (IIIB) were used as the component (III) in a ratio shown in Table 2.

The adhesive 6 for adhesive layers was prepared in the same manner as in (7) except that an isomer mixture of 4,4'-methylenebis(cyclohexyl isocyanate) (IIIA) and a burette compound of hexamethylene diisocyanate (IIIB) were used as the component (III) in a ratio shown in Table 3. This adhesive 6 for adhesive layers had the same composition as the above photochromic composition 8 except that it did not contain a photochromic compound.

Example 40

The laminate obtained in Example 39 was used to manufacture a plastic lens (optical article) and evaluate it in the same manner as in Example 2. The evaluation results are shown in Table 6.

Example 41

A laminate was produced in the same manner as in Example 25 except that a photochromic composition 9 shown in Table 2 was used in place of the photochromic composition 1 and an adhesive 7 for adhesive layers shown in Table 3 was used in place of the adhesive 2 for adhesive layers. The evaluation results are shown in Table 5.

The photochromic composition 9 was prepared in the same manner as in (2) except that an isomer mixture of 4,4'-methylenebis(cyclohexyl isocyanate) (IIIA) and an isocyanurate compound of hexamethylene diisocyanate (IIIB) were used as the component (III) in a ratio shown in Table 2.

The adhesive 7 for adhesive layers was prepared in the same manner as in (7) except that an isomer mixture of 4,4'-methylenebis(cyclohexyl isocyanate) (IIIA) and an isocyanurate compound of hexamethylene diisocyanate (IIIB) were used as the component (III) in a ratio shown in Table 3. This adhesive 7 for adhesive layers had the same composition as the above photochromic composition 9 except that it did not contain a photochromic compound.

Example 42

The laminate obtained in Example 41 was used to manufacture a plastic lens (optical article) and evaluate it in the same manner as in Example 2. The evaluation results are shown in Table 6.

Example 43

A laminate was produced in the same manner as in Example 25 except that a photochromic composition 10 shown in Table 2 was used in place of the photochromic composition 1 and an adhesive 8 for adhesive layers shown in Table 3 was used in place of the adhesive 2 for adhesive layers. The evaluation results are shown in Table 5.

The photochromic composition 10 was prepared in the same manner as in (2) except that an isomer mixture of 4,4'-methylenebis(cyclohexyl isocyanate) (IIIA) and an isocyanurate compound of hexamethylene diisocyanate (IIIB) were used as the component (III) in a ratio shown in Table 2.

The adhesive 8 for adhesive layers was prepared in the same manner as in (7) except that an isomer mixture of 4,4'-methylenebis(cyclohexyl isocyanate) (IIIA) and an isocyanurate compound of hexamethylene diisocyanate (IIIB) were used as the component (III) in a ratio shown in Table 3. This adhesive 8 for adhesive layers had the same composition as the above photochromic composition 10 except that it did not contain a photochromic compound.

Example 44

The laminate obtained in Example 43 was used to manufacture a plastic lens (optical article) and evaluate it in the same manner as in Example 2. The evaluation results are shown in Table 6.

Comparative Example 1

(1') Production of Polyurethane Urea Resin for Adhesive Layer Composed of Photochromic Composition A polyurethane resin (PI) having an isocyanate group at the end of the molecular chain and a polyurethane resin (PII) having a hydroxyl group at the end of the molecular chain were synthesized by the following methods.

(Synthesis of Polyurethane Resin (PI))

100 g of polycaprolactone polyol having a number average molecular weight of 1,000 (Placcel of Daicel Chemical Industries Ltd.) and 39.5 g of 4,4'-methylenebis(cyclohexyl isocyanate) were fed to a three-necked flask having a stirring blade, a cooling tube, a thermometer and a nitrogen gas introduction tube to carry out a reaction at 90° C. in a nitrogen atmosphere for 6 hours so as to obtain a prepolymer having an isocyanate group at the end (polyurethane resin (PI)). The molecular weight of the obtained prepolymer (polyurethane resin (PI)) was 2,500 (theoretical value; 2,800) in terms of polyoxyethylene.

(Synthesis of Polyurethane Resin (PII))

100 g of polycaprolactone polyol having a number average molecular weight of 1,000 (Placcel of Daicel Chemical Industries Ltd.) and 61.3 g of hydrogenated diphenymethane diisocyanate were fed to a three-necked flask having a stirring blade, a cooling tube, a thermometer and a nitrogen gas introduction tube to carry out a reaction at 90° C. in a nitrogen atmosphere for 6 hours so as to obtain a prepolymer having an isocyanate group at the end. After 200 ml of toluene was added, 12.7 g of 1,4-butanediol was added dropwise in a nitrogen atmosphere to carry out a reaction at 90° C. for 24 hours after the end of addition so as to synthesize a polyurethane resin having a hydroxyl group at the end of the molecular chain (PII). The molecular weight of the obtained polyurethane resin (PII) was 20,000 (theoretical value; 18,000) in terms of polyoxyethylene.

(2') Preparation of Photochromic Composition 175 g of the polyurethane resin (PI) obtained as described above, 376 g of a polyurethane resin (PII) solution, 5.7 g of a photochromic compound (PC1/PC2/PC3=4.0/1.0/0.7 g), 3.6 g of ethylenebis(oxyethylene)bis[3-(5-tert-butyl-4-hydroxy-m-tolyl)propionate] as an antioxidant and 0.5 g of DOW CORNING TORAY L-7001 as a surfactant were added, stirred and mixed together at room temperature to obtain a photochromic composition.

(3) The preparation of a polarizing film, (4) the production of a polyurethane urea resin for adhesive layer, (5) the preparation of an adhesive for adhesive layer, and (6) the production of a laminate were carried out completely in the same manner as in Example 1.

The obtained laminate had a visual transmittance of 41.0%, a polarization degree of 99.1%, and a visual transmittance on activated state of 11.0%, a fading speed of 45 seconds and a durability of 60% as photochromic properties after ultraviolet irradiation. The peel strength was 80 N/25 mm initially, 50 N/25 mm in a 70° C. atmosphere and 5 N/25 mm in a 150° C. atmosphere, and the adhesion stability time in a perspiration resistance test was about 24 hours.

Comparative Example 2

The laminate obtained in Comparative Example 1 was thermally bent and injection molded in the same manner as in Example 2 to produce a plastic lens (optical article) integrated with a polycarbonate resin. The obtained plastic lens had a visual transmittance of 41.0%, a polarization degree of 99.1%, and a visual transmittance on activated state of 11.0%, a fading speed of 45 seconds and a durability of 60% as photochromic properties after ultraviolet irradiation. The adhesion stability time in a perspiration resistance test was about 48 hours.

The physical properties of the resins used in the adhesive layers of the present invention are shown in Tables 1, 2 and 3, and the laminate configurations of the laminates of the present invention are shown in Table 4. The evaluation results of the laminates of the present invention and the evaluation results of the plastic lenses are shown in Tables 5 and 6. As for the softening points of the photochromic compositions and the adhesives for adhesive layers, the softening points of adhesive layers composed of photochromic compositions obtained by carrying out the same processing as in Examples and Comparative Examples and adhesive layers composed of the adhesives for adhesive layers are shown in Tables 2 and 3.

TABLE 1

| Resin component | number average molecular weight (Mn) | weight average molecular weight (Mw) | polydispersity (Mw/Mn) | softening point (° C.) | softening start temperature (° C.) | kinetic viscosity (cSt) |
|---|---|---|---|---|---|---|
| Polyurethane urea resin (U1) | 19,000 | 41,000 | 2.16 | 105 | About 80 | 15,000 |
| Polyurethane urea resin (U2) | 49,000 | 89,000 | 1.82 | 175 | About 155 | 2,500 |
| Polyurethane urea resin (U3) | 21,000 | 54,000 | 2.57 | 100 | About 50 | 55,000 |
| Polyurethane resin (PI) | — | 2,500 | — | — | — | — |
| Polyurethane resin (PII) | — | 20,000 | — | — | — | — |

TABLE 2

| | Resin as component (I) | polyisocyanate compound as component (III) | amount of polyisocyanate compound as component (III) *2 | softening point (° C.) *1 |
|---|---|---|---|---|
| Photochromic composition 1 | polyurethane urea resin (U1) | (IIIA) isomer mixture of 4,4'-methylenebis(cyclohexyl isocyanate) | 12 | 170 |

TABLE 2-continued

| | Resin as component (I) | polyisocyanate compound as component (III) | amount of polyisocyanate compound as component (III) *2 | softening point (° C.) *1 |
|---|---|---|---|---|
| Photochromic composition 2 | polyurethane urea resin (U3) | (IIIA) isomer mixture of 4,4'-methylenebis(cyclohexyl isocyanate) | 12 | 160 |
| Photochromic composition 3 | polyurethane urea resin (U1) | — | — | 105 |
| Photochromic composition 4 | polyurethane resin (PI) polyurethane resin (PII) | — | — | 80 |
| Photochromic composition 5 | polyurethane urea resin (U1) | (IIIA) isomer mixture of 4,4'-methylenebis(cyclohexyl isocyanate)/(IIIB) burette compound of hexamethylene diisocyanate | (IIIA)12.5/(IIIB)2.5 ((IIIA)100/(IIIB)20) | 160 |
| Photochromic composition 6 | polyurethane urea resin (U1) | (IIIA) isomer mixture of 4,4'-methylenebis(cyclohexyl isocyanate)/(IIIB) burette compound of hexamethylene diisocyanate | (IIIA)10/(IIIB)5 ((IIIA)100/(IIIB)50) | 150 |
| Photochromic composition 7 | polyurethane urea resin (U1) | (IIIA) isomer mixture of 4,4'-methylenebis(cyclohexyl isocyanate)/(IIIB) burette compound of hexamethylene diisocyanate | (IIIA)8.5/(IIIB)6.5 ((IIIA)100/(IIIB)76) | 140 |
| Photochromic composition 8 | polyurethane urea resin (U1) | (IIIA) isomer mixture of 4,4'-methylenebis(cyclohexyl isocyanate)/(IIIB) burette compound of hexamethylene diisocyanate | (IIIA)7.5/(IIIB)7.5 ((IIIA)100/(IIIB)100) | 135 |
| Photochromic composition 9 | polyurethane urea resin (U1) | (IIIA) isomer mixture of 4,4'-methylenebis(cyclohexyl isocyanate)/(IIIB) isocyanurate compound of hexamethylene diisocyanate | (IIIA)6.5/(IIIB)8.5 ((IIIA)100/(IIIB)131) | 120 |
| Photochromic composition 10 | polyurethane urea resin (U1) | (IIIA) isomer mixture of 4,4'-methylenebis(cyclohexyl isocyanate)/(IIIB) isocyanurate compound of hexamethylene diisocyanate | (IIIA)10/(IIIB)5 ((IIIA)100/(IIIB)50) | 150 |

*1; This softening point is the softening point of an adhesive layer.
*2; amount based on 100 parts by mass of the component (I)
Figures within parentheses show the amount of the component (IIIB) based on 100 parts by mass of the component (IIIA).

TABLE 3

| | Resin as component (I) | polyisocyanate compound as component (III) | amount of polyisocyanate compound as component (III) *2 | softening point (° C.) *1 |
|---|---|---|---|---|
| adhesive 1 for adhesive layer | polyurethane urea resin (U2) | — | — | 175 |
| adhesive 2 for adhesive layer | polyurethane urea resin (U1) | (IIIA) isomer mixture of 4,4'-methylenebis(cyclohexyl isocyanate) | 12 | 170 |
| adhesive 3 for adhesive layer | polyurethane urea resin (U1) | (IIIA) isomer mixture of 4,4'-methylenebis(cyclohexyl isocyanate)/(IIIB) burette compound of hexamethylene diisocyanate | (IIIA)12.5/(IIIB)2.5 ((IIIA)100/(IIIB)20) | 160 |
| adhesive 4 for adhesive layer | polyurethane urea resin (U1) | (IIIA) isomer mixture of 4,4'-methylenebiscyclohexyl isocyanate)/(IIIB) burette compound of hexamethylene diisocyanate | (IIIA)10/(IIIB)5 ((IIIA)100/(IIIB)50) | 150 |

TABLE 3-continued

| | Resin as component (I) | polyisocyanate compound as component (III) | amount of polyisocyanate compound as component (III) *2 | softening point (° C.) *1 |
|---|---|---|---|---|
| adhesive 5 for adhesive layer | polyurethane urea resin (U1) | (IIIA) isomer mixture of 4,4'-methylenebis(cyclohexyl isocyanate)/(IIIB) burette compound of hexamethylene diisocyanate | (IIIA)8.5/(IIIB)6.5 ((IIIA)100/(IIIB)76) | 140 |
| adhesive 6 for adhesive layer | polyurethane urea resin (U1) | (IIIA) isomer mixture of 4,4'-methylenebis(cyclohexyl isocyanate)/(IIIB) burette compound of hexamethylene diisocyanate | (IIIA)7.5/(IIIB)7.5 ((IIIA)100/(IIIB)20) | 135 |
| adhesive 7 for adhesive layer | polyurethane urea resin (U1) | (IIIA) isomer mixture of 4,4'-methylenebis(cyclohexyl isocyanate)/(IIIB) isocyanurate compound of hexamethylene diisocyanate | (IIIA)6.5/(IIIB)8.5 ((IIIA)100/(IIIB)131) | 120 |
| adhesive 8 for adhesive layer | polyurethane urea resin (U1) | (IIIA) isomer mixture of 4,4'-methylenebis(cyclohexyl isocyanate)/(IIIB) isocyanurate compound of hexamethylene diisocyanate | (IIIA)10/(IIIB)5 ((IIIA)100/(IIIB)50) | 150 |

*1; This softening point is the softening point of an adhesive layer.
*2; amount based on 100 parts by mass of the component (I)
Figures within parentheses show the amount of the component (IIIB) based on 100 parts by mass of the component (IIIA).

TABLE 4

| | Layer configuration of laminate |
|---|---|
| Example 1 | Polycarbonate/photochromic adhesive layer (photochromic composition 1)/polarizing film layer/adhesive layer (adhesive 1 for adhesive layer)/polycarbonate |
| Example 3 | Polycarbonate/photochromic adhesive layer (photochromic composition 1)/polarizing film layer/adhesive layer (acrylic adhesive)/polycarbonate |
| Example 5 | Polycarbonate/photochromic adhesive layer (photochromic composition 1)/polarizing film layer/adhesive layer (olefin-based adhesive)/polycarbonate |
| Example 7 | Polycarbonate/photochromic adhesive layer (photochromic composition 1)/polarizing film layer/adhesive layer (moisture-curable urethane adhesive + triisocyanate-based curing agent)/polycarbonate |
| Example 9 | Polycarbonate/photochromic adhesive layer (photochromic composition 1)/polarizing film layer/adhesive layer (polyvinyl alcohol-based adhesive)/polycarbonate |
| Example 11 | Polycarbonate/photochromic adhesive layer (photochromic composition 1)/polycarbonate/adhesive layer (adhesive 1 for adhesive layer)/polarizing film layer/adhesive layer (adhesive 1 for adhesive layer)/polycarbonate |
| Example 13 | Polycarbonate/adhesive layer (adhesive 1 for adhesive layer)/photochromic adhesive layer (photochromic composition 1)/adhesive layer (adhesive 1 for adhesive layer)/polycarbonate/adhesive layer (adhesive 1 for adhesive layer)/polarizing film layer/adhesive layer (adhesive 1 for adhesive layer)/polycarbonate |
| Example 15 | Polycarbonate/adhesive layer (moisture-curable urethane adhesive + triisocyanate-based curing agent)/photochromic adhesive layer (photochromic composition 1)/adhesive layer (moisture-curable urethane adhesive + triisocyanate-based curing agent)/polycarbonate/adhesive layer (adhesive 1 for adhesive layer)/polarizing film layer/adhesive layer (adhesive 1 for adhesive layer)/polycarbonate |
| Example 17 | Polycarbonate/adhesive layer (polyvinyl alcohol-based adhesive)/photochromic adhesive layer (photochromic composition 1)/adhesive layer (acrylic adhesive)/polycarbonate/adhesive layer (adhesive 1 for adhesive layer)/polarizing film layer/adhesive layer (adhesive 1 for adhesive layer)/polycarbonate |
| Example 19 | Polycarbonate/photochromic adhesive layer (photochromic composition 1)/TAC/polarizing film layer/TAC/adhesive layer (adhesive 1 for adhesive layer)/polycarbonate |
| Example 21 | Polycarbonate/adhesive layer (adhesive 1 for adhesive layer)/photochromic adhesive layer (photochromic composition 1)/adhesive layer (adhesive 1 for adhesive layer)/TAC/polarizing film layer/TAC/adhesive layer (adhesive 1 for adhesive layer)/polycarbonate |
| Example 23 | Polycarbonate/photochromic adhesive layer (photochromic composition 2)/polarizing film layer/adhesive layer (adhesive 1 for adhesive layer)/polycarbonate |

TABLE 4-continued

|  | Layer configuration of laminate |
| --- | --- |
| Example 25 | polycarbonate/adhesive layer (adhesive 1 for adhesive layer)/photochromic adhesive layer (photochromic composition 1)/polarizing film layer/adhesive layer (adhesive 2 for adhesive layer)/adhesive layer (adhesive 1 for adhesive layer)/polycarbonate |
| Example 27 | polycarbonate/photochromic adhesive layer (photochromic composition 3)/polarizing film layer/adhesive layer (adhesive 1 for adhesive layer)/polycarbonate |
| Example 29 | Polycarbonate/adhesive layer (adhesive 1 for adhesive layer)/photochromic adhesive layer (photochromic composition 3)/polarizing film layer/adhesive layer (adhesive 2 for adhesive layer)/adhesive layer (adhesive 1 for adhesive layer)/polycarbonate |
| Example 31 | Polycarbonate/adhesive layer (adhesive 1 for adhesive layer)/photochromic adhesive layer (photochromic composition 1)/polarizing film layer/adhesive layer (adhesive 2 for adhesive layer)/adhesive layer (adhesive 1 for adhesive layer)/polycarbonate |
| Example 33 | Polycarbonate/adhesive layer (adhesive 1 for adhesive layer)/photochromic adhesive layer (photochromic composition 5)/polarizing film layer/adhesive layer (adhesive 3 for adhesive layer)/adhesive layer (adhesive 1 for adhesive layer)/polycarbonate |
| Example 35 | Polycarbonate/adhesive layer (adhesive 1 for adhesive layer)/photochromic adhesive layer (photochromic composition 6)/polarizing film layer/adhesive layer (adhesive 4 for adhesive layer)/adhesive layer (adhesive 1 for adhesive layer)/polycarbonate |
| Example 37 | Polycarbonate/adhesive layer (adhesive 1 for adhesive layer)/photochromic adhesive layer (photochromic composition 7)/polarizing film layer/adhesive layer (adhesive 5 for adhesive layer)/adhesive layer (adhesive 1 for adhesive layer)/polycarbonate |
| Example 39 | Polycarbonate/adhesive layer (adhesive 1 for adhesive layer)/photochromic adhesive layer (photochromic composition 8)/polarizing film layer/adhesive layer (adhesive 6 for adhesive layer)/adhesive layer (adhesive 1 for adhesive layer)/polycarbonate |
| Example 41 | Polycarbonate/adhesive layer (adhesive 1 for adhesive layer)/photochromic adhesive layer (photochromic composition 9)/polarizing film layer/adhesive layer (adhesive 7 for adhesive layer)/adhesive layer (adhesive 1 for adhesive layer)/polycarbonate |
| Example 43 | Polycarbonate/adhesive layer (adhesive 1 for adhesive layer)/photochromic adhesive layer (photochromic composition 10)/polarizing film layer/adhesive layer (adhesive 8 for adhesive layer)/adhesive layer (adhesive 1 for adhesive layer)/polycarbonate |
| Comparative Example 1 | Polycarbonate/photochromic adhesive layer (photochromic composition 4)/polarizing film layer/adhesive layer (adhesive 1 for adhesive layer)/polycarbonate |

TABLE 5

|  | Visual Transmittance (%) | polarization degree (%) | photochromic properties | | |
| --- | --- | --- | --- | --- | --- |
|  |  |  | Visual transmittance (%) | fading speed (sec) | Durability (%) |
| Ex. 1 | 41.0 | 99.1 | 11.0 | 45 | 93 |
| Ex. 3 | 41.0 | 99.1 | 11.0 | 45 | 93 |
| Ex. 5 | 41.0 | 99.1 | 11.0 | 45 | 93 |
| Ex. 7 | 41.0 | 99.1 | 11.0 | 45 | 93 |
| Ex. 9 | 41.0 | 99.1 | 11.0 | 45 | 93 |
| Ex. 11 | 41.3 | 99.2 | 11.0 | 45 | 93 |
| Ex. 13 | 41.5 | 99.0 | 11.0 | 45 | 93 |
| Ex. 15 | 41.5 | 99.0 | 11.0 | 45 | 93 |
| Ex. 17 | 41.5 | 99.0 | 11.0 | 45 | 93 |
| Ex. 19 | 43.3 | 99.9 | 11.0 | 45 | 93 |
| Ex. 21 | 43.3 | 99.9 | 11.0 | 45 | 93 |
| Ex. 23 | 41.0 | 99.1 | 11.0 | 45 | 91 |
| Ex. 25 | 41.0 | 99.1 | 11.0 | 45 | 93 |
| Ex. 27 | 41.0 | 99.1 | 11.0 | 45 | 93 |
| Ex. 29 | 41.0 | 99.1 | 11.0 | 45 | 93 |
| Ex. 31 | 41.0 | 99.1 | 11.0 | 45 | 93 |
| Ex. 33 | 41.0 | 99.1 | 11.0 | 45 | 93 |
| Ex. 35 | 41.0 | 99.1 | 11.0 | 45 | 93 |
| Ex. 37 | 41.0 | 99.1 | 11.0 | 45 | 93 |
| Ex. 39 | 41.0 | 99.1 | 11.0 | 45 | 93 |
| Ex. 41 | 41.0 | 99.1 | 11.0 | 45 | 93 |
| Ex. 43 | 41.0 | 99.1 | 11.0 | 45 | 93 |
| C. Ex. 1 | 41.0 | 99.1 | 11.0 | 45 | 60 |

TABLE 5-continued

|  | peel strength(N/25 mm) | | | perspiration resistance test |
|---|---|---|---|---|
|  | room temperature | 70° C. | 150° C. | (hours) |
| Ex. 1 | 150 | 120 | 20 | 400 |
| Ex. 3 | 120 | 90 | 10 | 200 |
| Ex. 5 | 120 | 80 | 10 | 200 |
| Ex. 7 | 160 | 120 | 20 | 450 |
| Ex. 9 | 130 | 100 | 15 | 350 |
| Ex. 11 | 140 | 110 | 20 | 400 |
| Ex. 13 | 180 | 125 | 30 | 800 |
| Ex. 15 | 170 | 125 | 30 | 700 |
| Ex. 17 | 130 | 110 | 20 | 500 |
| Ex. 19 | 140 | 110 | 20 | 400 |
| Ex. 21 | 180 | 125 | 30 | 800 |
| Ex. 23 | 140 | 80 | 20 | 100 |
| Ex. 25 | 180 | 130 | 40 | 900 |
| Ex. 27 | 100 | 70 | 10 | 120 |
| Ex. 29 | 120 | 80 | 10 | 192 |
| Ex. 31 | 160 | 125 | 30 | 504 |
| Ex. 33 | 190 | 130 | 35 | 1100 |
| Ex. 35 | 200 | 140 | 35 | 1300 |
| Ex. 37 | 200 | 140 | 35 | 1300 |
| Ex. 39 | 180 | 130 | 25 | 1000 |
| Ex. 41 | 160 | 100 | 15 | 700 |
| Ex. 43 | 200 | 130 | 35 | 1300 |
| C. Ex. 1 | 80 | 50 | 5 | 24 |

Ex.: Example
C. Ex.: Comparative Example

TABLE 6

|  |  |  | photochromic properties | | |
|---|---|---|---|---|---|
|  | Visual Transmittance (%) | polarization degree (%) | Visual transmittance (%) | fading speed (sec) | Durability (%) |
| Ex. 2 | 40.5 | 99.1 | 11.0 | 45 | 93 |
| Ex. 4 | 40.6 | 99.1 | 11.0 | 45 | 93 |
| Ex. 6 | 40.6 | 99.1 | 11.0 | 45 | 93 |
| Ex. 8 | 40.6 | 99.1 | 11.0 | 45 | 93 |
| Ex. 10 | 40.6 | 99.1 | 11.0 | 45 | 93 |
| Ex. 12 | 40.6 | 99.1 | 11.0 | 45 | 93 |
| Ex. 14 | 40.8 | 99.0 | 11.0 | 45 | 93 |
| Ex. 16 | 40.8 | 99.0 | 11.0 | 45 | 93 |
| Ex. 18 | 40.8 | 99.0 | 11.0 | 45 | 93 |
| Ex. 20 | 43.2 | 99.9 | 11.0 | 45 | 93 |
| Ex. 22 | 43.2 | 99.9 | 11.0 | 45 | 93 |
| Ex. 24 | 40.5 | 99.1 | 11.0 | 45 | 91 |
| Ex. 26 | 40.7 | 99.1 | 11.0 | 45 | 93 |
| Ex. 28 | 40.5 | 99.1 | 11.0 | 45 | 93 |
| Ex. 30 | 40.5 | 99.1 | 11.0 | 45 | 93 |
| Ex. 32 | 40.5 | 99.1 | 11.0 | 45 | 93 |
| Ex. 34 | 40.7 | 99.1 | 11.0 | 45 | 93 |
| Ex. 36 | 40.7 | 99.1 | 11.0 | 45 | 93 |
| Ex. 38 | 40.7 | 99.1 | 11.0 | 45 | 93 |
| Ex. 40 | 40.7 | 99.1 | 11.0 | 45 | 93 |
| Ex. 42 | 40.7 | 99.1 | 11.0 | 45 | 93 |
| Ex. 44 | 40.7 | 99.1 | 11.0 | 45 | 93 |
| C. Ex. 2 | 41.0 | 99.1 | 11.0 | 45 | 60 |

|  | perspiration resistance test (hours) | bending workability |
|---|---|---|
| Ex. 2 | 1000 | A |
| Ex. 4 | 500 | B |
| Ex. 6 | 400 | B |
| Ex. 8 | 1000 | B |
| Ex. 10 | 800 | B |
| Ex. 12 | 1000 | A |
| Ex. 14 | 1400 | A |
| Ex. 16 | 1300 | B |
| Ex. 18 | 1100 | B |
| Ex. 20 | 900 | A |

TABLE 6-continued

| Ex. 22 | 1400 | A |
| --- | --- | --- |
| Ex. 24 | 300 | B |
| Ex. 26 | 1500 | A |
| Ex. 28 | 360 | B |
| Ex. 30 | 480 | B |
| Ex. 32 | 1104 | A |
| Ex. 34 | 1600 | A |
| Ex. 36 | 1800 | A |
| Ex. 38 | 1800 | A |
| Ex. 40 | 1600 | B |
| Ex. 42 | 1000 | A |
| Ex. 44 | 1800 | A |
| C. Ex. 2 | 48 | C |

Ex.: Example
C. Ex.: Comparative Example

As obvious from the above Examples 1 to 44, it is understood that the laminate of the present invention in which the polyurethane urea resin is used in the adhesive layer composed of the photochromic composition has excellent photochromic properties, polarization properties and excellent adhesion at a high temperature and in a perspiration resistance test.

As shown in Comparative Examples 1 and 2, when the two-liquid curable urethane resin is used in the adhesive layer composed of the photochromic composition, photochromic properties (durability) and adhesion are unsatisfactory Effect of the Invention The laminate of the present invention exhibits excellent adhesion, polarization properties and photochromic properties. Further, even when an optical article is manufactured by setting the laminate of the present invention in a mold and injection molding a polycarbonate layer as a thermoplastic resin layer in the mold, excellent adhesion is obtained not only for the laminate but also between the laminate and the injection molded polycarbonate layer, excellent polarization properties and photochromic properties are retained, and optical distortion hardly occurs.

The invention claimed is:

1. A laminate comprising a pair of polycarbonate optical sheets or films which are laminated together through a polarizing film layer and an adhesive layer of a photochromic composition comprising (I) a polyurethane urea resin and (II) a photochromic compound,
    wherein the photochromic composition further comprises (III) a polyisocyanate compound having at least two isocyanate groups in the molecule, and the polyisocyanate compound having at least two isocyanate groups in the molecule (III) comprises (IIIA) a compound having an isocyanate group bonded to a secondary carbon and (IIIB) at least one compound selected from the group consisting of hexamethylene diisocyanate, burette compound of hexamethylene diisocyanate, isocyanurate compound of hexamethylene diisocyanate and adduct compound of hexamethylene diisocyanate.

2. The laminate according to claim 1, wherein the weight average molecular weight/number average molecular weight ratio indicative of polydispersity of the polyurethane urea resin (I) is 1.6 to 2.4.

3. The laminate according to claim 1, wherein the polyisocyanate compound having at least two isocyanate groups in the molecule (III) comprises 100 parts by mass of the compound having an isocyanate group bonded to a secondary carbon (IIIA) and 20 to 150 parts by mass of at least one compound (IIIB) selected from the group consisting of hexamethylene diisocyanate, burette compound of hexamethylene diisocyanate, isocyanurate compound of hexamethylene diisocyanate and adduct compound of hexamethylene diisocyanate.

4. The laminate according to claim 1, wherein the polyurethane urea resin (I) is a reaction product of (A) a urethane prepolymer having an isocyanate group at the end of the molecule, (B) a polyamine compound having at least two amino groups in the molecule and (C) a compound having one group able to react with an isocyanate group in the molecule.

5. The laminate according to claim 1, wherein the polycarbonate optical sheet or film and the polarizing film layer and/or the polarizing film layer and the adhesive layer of the photochromic composition are laminated together through an adhesive layer containing no photochromic compound.

6. The laminate according claim 5, wherein the softening points of the adhesive layer of the photochromic composition and the adhesive layer containing no photochromic compound are not lower than 100° C.

7. The laminate according to claim 5, wherein the polycarbonate optical sheet or film, the adhesive layer containing no photochromic compound, the adhesive layer of the photochromic composition, the polarizing film layer, the adhesive layer containing no photochromic compound and the polycarbonate optical sheet or film are laminated in this order.

8. The laminate according to claim 7, wherein the adhesive layer of the photochromic composition described before the polarizing film differs from the adhesive layer containing no photochromic compound described after the polarizing film only in that the former layer contains the photochromic compound.

9. The laminate according to claim 7, wherein an adhesive layer which differs from the adhesive layer containing no photochromic compound is further existent between the adhesive layer containing no photochromic compound described after the polarizing film layer and the polycarbonate optical sheet or film.

10. The laminate according to claim 1, wherein at least one optical sheet or film is existent between the polarizing film layer and the adhesive layer of the photochromic composition.

11. The laminate according to claim 1, wherein a cellulose triacetate film is laminated on both sides of the polarizing film layer.

12. The laminate according to claim 1, wherein the softening point of the adhesive layer of the photochromic composition is not lower than 100° C.

13. An optical article manufactured by laminating a polycarbonate layer on the front surface of a polycarbonate optical sheet or film on the polarizing film layer side of the laminate of claim 1.

* * * * *